US012222626B2

(12) United States Patent
Tian et al.

(10) Patent No.: US 12,222,626 B2
(45) Date of Patent: Feb. 11, 2025

(54) DISPLAY SUBSTRATE AND METHOD FOR MANUFACTURING THE SAME, DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Chao Tian, Beijing (CN); Gang Hua, Beijing (CN); Zhiyong Wang, Beijing (CN); Qi Sun, Beijing (CN); Dong Wang, Beijing (CN); Meng Gong, Beijing (CN); Min Wang, Beijing (CN); Liguang Deng, Beijing (CN); Zhe Wang, Beijing (CN); Shaobo Li, Beijing (CN); Jintang Hu, Beijing (CN); Pengkai Fan, Beijing (CN); Shilong Liang, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 748 days.

(21) Appl. No.: 17/310,907

(22) PCT Filed: Apr. 15, 2021

(86) PCT No.: PCT/CN2021/087468
§ 371 (c)(1),
(2) Date: Aug. 30, 2021

(87) PCT Pub. No.: WO2021/213242
PCT Pub. Date: Oct. 28, 2021

(65) Prior Publication Data
US 2023/0137930 A1    May 4, 2023

(30) Foreign Application Priority Data

Apr. 21, 2020    (CN) .......................... 202010319592.9

(51) Int. Cl.
G02F 1/16766    (2019.01)
G02F 1/167    (2019.01)

(52) U.S. Cl.
CPC .......... *G02F 1/16766* (2019.01); *G02F 1/167* (2013.01)

(58) Field of Classification Search
CPC ......... G02F 1/136286; G02F 1/133707; G02F 1/1368; G02F 1/134309; G02F 1/136213;
(Continued)

(56) References Cited

U.S. PATENT DOCUMENTS

2002/0113927 A1    8/2002  Ha et al.
2006/0194500 A1    8/2006  Ishii
(Continued)

FOREIGN PATENT DOCUMENTS

CN    101097931 A    1/2008
CN    101128939 A    2/2008
(Continued)

*Primary Examiner* — Brandi N Thomas
(74) *Attorney, Agent, or Firm* — Kinney & Lange, P.A.

(57) ABSTRACT

A display substrate, including: a base substrate; a plurality of gate lines and a plurality of data lines that intersect to surround a plurality of pixels; wherein each pixel includes a first thin film transistor, a second thin film transistor and a pixel electrode. A first electrode of the first thin film transistor is electrically connected to a pixel conductive layer of the pixel electrode, a second electrode of the first thin film transistor is electrically connected to a first electrode of the second thin film transistor, and a second electrode of the second thin film transistor is electrically connected to the data line. An orthographic projection of a combination of the second electrode of the first thin film transistor and the first (Continued)

electrode of the second thin film transistor on the base substrate at least partially overlaps with an orthographic projection of the pixel conductive layer on the base substrate.

20 Claims, 22 Drawing Sheets

(58) Field of Classification Search
CPC ........... G02F 1/13624; G02F 1/134345; G02F 1/133753; G02F 2201/40; G02F 1/133742; G02F 1/133746; G02F 1/133788; G02F 1/1343; G02F 1/134318; G02F 1/133512; G02F 1/133723; G02F 1/1362; G02F 1/136227; G02F 1/1393; G02F 1/133555; G02F 1/167; G02F 1/1309; G02F 1/133514; G02F 1/133531; G02F 1/136209; G02F 2201/121; G02F 1/1337; G02F 1/136222; G02F 1/136259; G02F 1/136295; G02F 2201/123; G02F 1/133711; G02F 1/134336; G02F 1/134363; G02F 1/136263; G02F 1/133305; G02F 1/13439; G02F 1/136; G02F 2202/02; G02F 1/13338; G02F 1/133761; G02F 1/136218; G02F 1/133345; G02F 1/133371; G02F 1/13606; G02F 1/1335; G02F 1/1345; G02F 1/13629; G02F 1/16766; G02F 1/133354; G02F 1/133528; G02F 1/133562; G02F 1/133703; G02F 1/133719; G02F 1/134372; G02F 1/13456; G02F 1/13625; G02F 1/136254; G02F 1/13685; G02F 1/1677; G02F 2202/16; G02F 2203/30; G02F 1/13452; G02F 1/13394; G02F 1/136236; G02F 1/13312; G02F 1/13318; G02F 1/1333; G02F 1/133302; G02F 1/133388; G02F 1/133516; G02F 1/13363; G02F 1/13396; G02F 1/13398; G02F 1/134354; G02F 1/13458; G02F 1/136268; G02F 1/136272; G02F 1/1676; G02F 1/1685
See application file for complete search history.

(56) References Cited

U.S. PATENT DOCUMENTS

| | | | |
|---|---|---|---|
| 2007/0195241 A1 | 8/2007 | Lim | |
| 2007/0279542 A1* | 12/2007 | Kim | ................ G02F 1/136259 |
| | | | 349/38 |
| 2013/0010247 A1 | 1/2013 | Wei et al. | |
| 2013/0314636 A1 | 11/2013 | Chen et al. | |
| 2018/0053795 A1 | 2/2018 | Lan | |

FOREIGN PATENT DOCUMENTS

| | | | | |
|---|---|---|---|---|
| CN | 102402087 A | 4/2012 | | |
| CN | 103137616 A | 6/2013 | | |
| CN | 104062788 A | 9/2014 | | |
| CN | 106886111 A | 6/2017 | | |
| JP | 2013074191 A | 4/2013 | | |
| WO | WO-2021213242 A1 * | 10/2021 | ............. | G02F 1/167 |

* cited by examiner

US 12,222,626 B2

DISPLAY SUBSTRATE AND METHOD FOR MANUFACTURING THE SAME, DISPLAY DEVICE

CROSS-REFERENCE TO RELATED APPLICATION(S)

This application is a Section 371 National Stage Application of International Application No. PCT/CN2021/087468, filed on Apr. 15, 2021, which claims priority to Chinese Application No. 202010319592.9, filed on Apr. 21, 2020, entitled "DISPLAY SUBSTRATE AND METHOD FOR MANUFACTURING THE SAME, DISPLAY DEVICE", the contents of which are incorporated by reference in their entireties.

TECHNICAL FIELD

The present disclosure relates to a field of display technology, and in particular to a display substrate, a method for manufacturing the display substrate and a display device.

BACKGROUND

An electronic paper display device is a new display device that has advantages of both display and paper. The display effect of the electronic paper display device is similar to the display effect of paper, and the electronic paper display device has advantages of flexible display, portable, rewritable and low power consumption.

The existing electronic paper display device usually includes an upper substrate, a lower substrate and an electronic ink between the upper substrate and the lower substrate. A thin film transistor is disposed on the lower substrate, the thin film transistor controls an electric field between a pixel electrode and a common electrode, and the electric field controls the electronic ink for display. However, the existing electronic paper display device usually has a low opening ratio, which affects the performance of the electronic paper display device.

The above information disclosed in this section is only used to understand the background of the inventive concept of the present disclosure, and therefore, the above information may include information that does not constitute the prior art.

SUMMARY

In one aspect, a display substrate is provided, including:
a base substrate;
a plurality of gate lines and a plurality of data lines on the base substrate, wherein each gate line extends in a row direction, each data line extends in a column direction, and the plurality of gate lines and the plurality of data lines intersect to surround a plurality of pixels;
a first thin film transistor and a second thin film transistor in each pixel on the base substrate, wherein each of the first thin film transistor and the second thin film transistor includes a first electrode and a second electrode; and
a pixel electrode in each pixel on the base substrate, wherein the pixel electrode includes a pixel conductive layer, the first electrode is located in a layer different from a layer where the pixel conductive layer is located, and the second electrode is located in a layer different from the layer where the pixel conductive layer is located, wherein the first electrode of the first thin film transistor is electrically connected to the pixel conductive layer of the pixel electrode, the second electrode of the first thin film transistor is electrically connected to the first electrode of the second thin film transistor, and the second electrode of the second thin film transistor is electrically connected to the data line; and wherein an orthographic projection of a combination of the second electrode of the first thin film transistor and the first electrode of the second thin film transistor on the base substrate at least partially overlaps with an orthographic projection of the pixel conductive layer of the pixel electrode on the base substrate.

According to some exemplary embodiments, each of the first thin film transistor and the second thin film transistor further includes a gate electrode, and the gate electrode of the first thin film transistor and the gate electrode of the second thin film transistor are disposed at an interval in the row direction;

the orthographic projection of the pixel conductive layer on the base substrate and an orthographic projection of each of the gate electrode of the first thin film transistor and the gate electrode of the second thin film transistor on the base substrate are disposed at an interval.

According to some exemplary embodiments, the pixel conductive layer includes a first protrusion, the orthographic projection of the combination of the second electrode of the first thin film transistor and the first electrode of the second thin film transistor on the base substrate at least partially overlaps with an orthographic projection of the first protrusion on the base substrate, the orthographic projection of the first protrusion on the base substrate and the orthographic projection of the gate electrode of the first thin film transistor on the base substrate are disposed at an interval, and the orthographic projection of the first protrusion on the base substrate and the orthographic projection of the gate electrode of the second thin film transistor on the base substrate are disposed at an interval.

According to some exemplary embodiments, the pixel conductive layer includes a body portion, a first protrusion extending from the body portion and a second protrusion extending from the body portion, the first protrusion extends in the column direction, the second protrusion extends in the row direction, the first protrusion and the second protrusion are connected to each other, so that the pixel conductive layer includes a first opening and a second opening; and
each of the first thin film transistor and the second thin film transistor includes a channel region, the first opening exposes the channel region of the first thin film transistor, and the second opening exposes the channel region of the second thin film transistor.

According to some exemplary embodiments, the display substrate includes a first gate protrusion and a second gate protrusion extending from the gate line, a gate electrode of the first thin film transistor is formed in an overlapping area between the first gate protrusion and the channel region of the first thin film transistor, and a gate electrode of the second thin film transistor is formed in an overlapping area between the second gate protrusion and the channel region of the second thin film transistor; and
the orthographic projection of the combination of the second electrode of the first thin film transistor and the first electrode of the second thin film transistor on the base substrate at least partially overlaps with an orthographic projection of the first protrusion on the base substrate, the orthographic projection of the first protrusion on the base substrate and an orthographic projection of the channel region of the first thin film transistor on the base substrate are disposed at an interval, and the orthographic projection of the first protrusion on the base substrate and an orthographic projection of the channel region of the second thin film transistor on the base substrate are disposed at an interval.

According to some exemplary embodiments, an orthographic projection of the first gate protrusion on the base substrate at least partially overlaps with an orthographic projection of the second protrusion on the base substrate.

According to some exemplary embodiments, an orthographic projection of the second gate protrusion on the base substrate at least partially overlaps with the orthographic projection of the second protrusion on the base substrate.

According to some exemplary embodiments, the orthographic projection of the second protrusion on the base substrate and the orthographic projection of the channel region of the first thin film transistor on the base substrate are disposed at an interval, and the orthographic projection of the second protrusion on the base substrate and the orthographic projection of the channel region of the second thin film transistor on the base substrate are disposed at an interval.

According to some exemplary embodiments, the orthographic projection of the pixel conductive layer of the pixel electrode on the base substrate and an orthographic projection of the second electrode of the second thin film transistor on the base substrate are disposed at an interval.

According to some exemplary embodiments, the pixel electrode further includes a gate conductive layer, and the gate conductive layer is electrically connected to the pixel conductive layer;
the gate conductive layer and the gate electrode are located in a same layer and are formed of a same material, and the first electrode and the second electrode are located on a side of the gate electrode away from the base substrate.

According to some exemplary embodiments, the display substrate further includes a common electrode, the common electrode is located in the same layer as the first electrode and the second electrode;
the common electrode is located between the pixel conductive layer and the gate conductive layer, and an orthographic projection of each of the pixel conductive layer and the gate conductive layer on the base substrate at least partially overlaps with an orthographic projection of the common electrode on the base substrate.

According to some exemplary embodiments, the orthographic projection of the pixel conductive layer on the base substrate covers an orthographic projection of the gate conductive layer on the base substrate, and an area of the orthographic projection of the pixel conductive layer on the base substrate is greater than an area of the orthographic projection of the gate conductive layer on the base substrate.

According to some exemplary embodiments, an orthographic projection of the gate conductive layer on the base substrate covers an orthographic projection of the common electrode on the base substrate, and an area of the orthographic projection of the gate conductive layer on the base substrate is greater than an area of the orthographic projection of the common electrode on the base substrate.

According to some exemplary embodiments, the orthographic projection of the pixel conductive layer of the pixel electrode on the base substrate at least partially overlaps with an orthographic projection of the second electrode of the second thin film transistor on the base substrate.

According to some exemplary embodiments, the pixel conductive layer further includes the second protrusion, the orthographic projection of the second protrusion on the base substrate at least partially overlaps with an orthographic projection of the second electrode of the second thin film transistor on the base substrate, and the orthographic projection of the second protrusion on the base substrate and an orthographic projection of the gate electrode of the second thin film transistor on the base substrate are disposed at an interval.

According to some exemplary embodiments, the orthographic projection of the pixel conductive layer on the base substrate covers the orthographic projections of each of the gate electrode, the first electrode and the second electrode of each of the first thin film transistor and the second thin film transistor on the base substrate.

According to some exemplary embodiments, a width of the orthographic projection of the first protrusion on the base substrate in the row direction is 3.4 to 6.5 micrometers;
a distance between the orthographic projection of the first protrusion on the base substrate and the orthographic projection of the gate electrode of the first thin film transistor on the base substrate in the row direction is 1.75 to 3.3 micrometers; and/or,
a distance between the orthographic projection of the first protrusion on the base substrate and the orthographic projection of the gate electrode of the second thin film transistor on the base substrate in the row direction is 1.75 to 3.3 micrometers.

According to some exemplary embodiments, a width of the orthographic projection of the second protrusion on the base substrate in the row direction is 3.4 to 4.4 micrometers; and/or,
a distance between the orthographic projection of the second protrusion on the base substrate and an orthographic projection of the gate electrode of the second thin film transistor on the base substrate in the row direction is 1.75 to 2.75 micrometers.

According to some exemplary embodiments, the orthographic projection of the pixel conductive layer of the pixel electrode on the base substrate and an orthographic projection of each of the gate line and the data line on the base substrate are disposed at an interval.

According to some exemplary embodiments, a distance between the orthographic projection of the first protrusion on the base substrate and the orthographic projection of the channel region of each of the first thin film transistor and the second thin film transistor on the base substrate in the row direction is 1 to 3 micrometers; and/or,
a distance between the orthographic projection of the second protrusion on the base substrate and an orthographic projection of the gate line on the base substrate in the column direction is 0.01 to 3 micrometers; and/or,
a distance between an orthographic projection of the body portion on the base substrate and an orthographic projection of the data line on the base substrate in the row direction is 0.01 to 3 micrometers.

According to some exemplary embodiments, the first electrode and the second electrode of the first thin film transistor and the first electrode and the second electrode of the second thin film transistor are located in the same layer, and the second electrode of the first thin film transistor and the first electrode of the second thin film transistor are a continuously extending structure.

According to some exemplary embodiments, the pixel conductive layer includes a transparent conductive material.

According to some exemplary embodiments, the first electrode and the second electrode of the first thin film transistor and the first electrode and the second electrode of the second thin film transistor are located in the same layer, and the display substrate further includes:
- a gate insulating layer on the base substrate and covering the gate electrode and the gate conductive layer;
- an active layer on the base substrate, wherein the active layer is located between the gate insulating layer and a layer where the first electrode and the second electrode are located; and
- a passivation layer on the base substrate, wherein the passivation layer is located between the layer where the first electrode and the second electrode are located and the pixel conductive layer,
- wherein the pixel conductive layer is located on a side of the layer where the first electrode and the second electrode are located away from the base substrate, the pixel conductive layer is electrically connected to the first electrode of the first thin film transistor through a via hole formed in the passivation layer, and the pixel conductive layer is electrically connected to the gate conductive layer through a via hole formed in the passivation layer and the gate insulating layer.

According to some exemplary embodiments, the display panel further includes a common electrode line on the base substrate,
- wherein the common electrode line extends parallel to the data line, common electrodes of the plurality of pixels are electrically connected through the common electrode line.

In another aspect, a display device is provided, wherein the display device includes:
- the display substrate described above; and
- an electronic ink layer on a side of a pixel conductive layer away from a base substrate.

In yet another aspect, a method for manufacturing a display substrate is provided, including following steps:
- forming a first conductive layer on a base substrate through a first patterning process, wherein the first conductive layer includes a gate conductive layer and a gate electrode of each of a first thin film transistor and a second thin film transistor;
- forming an active layer and a second conductive layer on a side of the first conductive layer away from the base substrate through a second patterning process, wherein the second conductive layer includes a common electrode, a data line, and a first electrode and a second electrode of each of the first thin film transistor and the second thin film transistor;
- forming a passivation layer on a side of the second conductive layer away from the base substrate through a third patterning process; and
- forming a pixel conductive layer on a side of the passivation layer away from the base substrate through a fourth patterning process,
- wherein the pixel conductive layer is electrically connected to the first electrode of the first thin film transistor and the gate conductive layer, the second electrode of the first thin film transistor is electrically connected to the first electrode of the second thin film transistor, and the second electrode of the second thin film transistor is electrically connected to a data line; and
- wherein an orthographic projection of a combination of the second electrode of the first thin film transistor and the first electrode of the second thin film transistor on the base substrate at least partially overlaps with an orthographic projection of the pixel conductive layer on the base substrate.

BRIEF DESCRIPTION OF THE DRAWINGS

Through the following description of the present disclosure with reference to the drawings, other purposes and advantages of the present disclosure will be apparent and may help a comprehensive understanding of the present disclosure.

Figure 1:
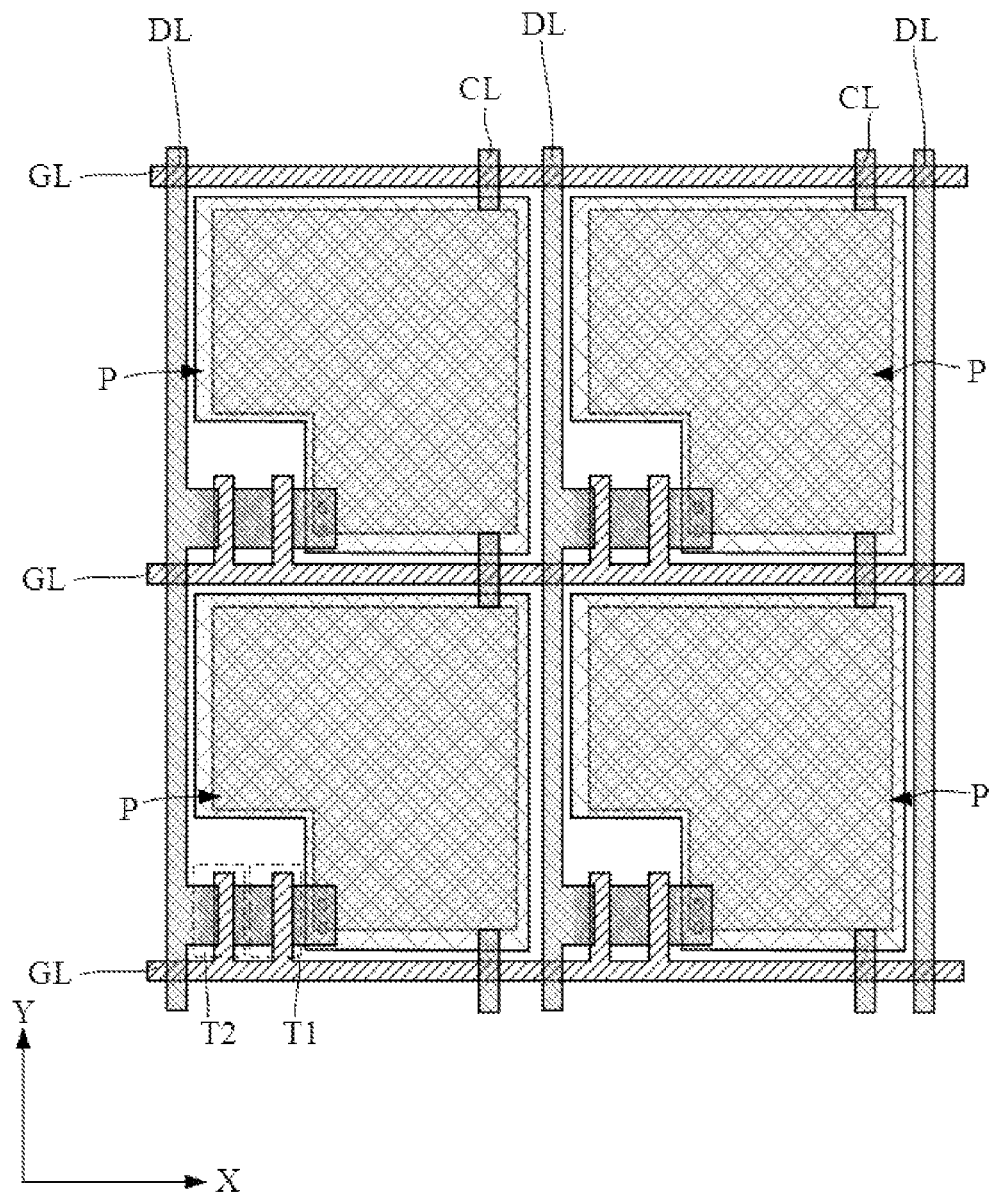
FIG. 1 is a schematic plan view of a display substrate in the prior art, which schematically illustrates a plurality of (for example, 4) pixels included in the display substrate.

It should be noted that, for clarity, in the drawings used to describe the embodiments of the present disclosure, sizes of layers, structures, or regions may be enlarged or reduced, that is, the drawings are not drawn according to actual scale.

DETAILED DESCRIPTION OF EMBODIMENTS

In the following description, for purpose of explanation, many specific details are set forth to provide a comprehensive understanding of various exemplary embodiments. However, it is obvious that the various exemplary embodiments may be implemented without the specific details or with one or more equivalent arrangements. In other cases, well-known structures and devices are shown in block diagrams to avoid unnecessarily obscuring the various exemplary embodiments. In addition, the various exemplary embodiments may be different, but are not necessarily exclusive. For example, without departing from the inventive concept, specific shapes, configurations and characteristics of an exemplary embodiment may be used or implemented in another exemplary embodiment.

In the drawings, sizes and relative sizes of elements may be enlarged for clarity and/or description purposes. In this way, a size and a relative size of each element are not necessarily to be limited to a size and a relative size shown in the drawing. When the exemplary embodiment may be implemented differently, a specific process sequence may be performed differently from a sequence described. For example, two consecutively described processes may be performed substantially simultaneously or in an order opposite to the described order. In addition, the same reference numerals indicate the same elements.

When an element is described as being "on", "connected to" or "coupled to" another element, the element may be directly on the another element, directly connected to the another element or directly coupled to the another element, or there may be an intermediate element. However, when an element is described as being "directly on", "directly connected to" or "directly coupled to" another element, there is no intermediate element. Other terms and/or expressions used to describe the relationship between elements should be interpreted in a similar manner, for example, "between" and "directly between", "adjacent" and "directly adjacent", "above" and "directly above" etc. In addition, the term "connect" may refer to a physical connection, an electrical connection, a communication connection, and/or a fluid connection. In addition, X axis, Y axis, and Z axis are not limited to three axes of a Cartesian coordinate system, which may be interpreted in broader meaning. For example, the X axis, the Y axis, and the Z axis may be perpendicular to each other, or may represent different directions that are not perpendicular to each other. For the purpose of the present disclosure, "at least one of X, Y, and Z" and "at least one selected from a group consisting of X, Y, and Z" may be interpreted as only X, only Y, only Z, or any combination of two or more of X, Y, and Z such as XYZ, XY, YZ, and XZ. As shown in the present disclosure, the term "and/or" includes any and all combinations of one or more of the related items.

It should be understood that, although terms "first", "second", etc. may be used herein to describe various elements, the elements should not be limited by the terms. The terms are only used to distinguish one element from another. For example, without departing from the scope of the exemplary embodiments, a first element may be named as a second element, and similarly, a second element may be named as a first element.

In the present disclosure, unless otherwise specified, an expression "patterning process" generally includes steps of photoresist coating, exposure, development, etching and photoresist stripping, and the like. The expression "one patterning process" refers to a process of forming patterned layers, elements, components and the like by using one mask.

It should be noted that, an expression "same layer" refers to a layer structure formed by using a same film forming process to form a film layer for forming specific patterns, and then using a same mask to pattern the film layer through a patterning process. Depending on different specific patterns, the patterning process may include a plurality of exposure, development or etching processes, and the specific patterns in the formed layer structure may be continuous or discontinuous. The specific patterns may also be located at different heights or have different thicknesses.

It should be noted that, in order to clearly illustrate a stacking relationship between various elements, components, members or patterns, in the drawings of the present disclosure, unless otherwise specified, elements, components, members or patterns located in the same layer are generally shown using a same cross-sectional line.

It should be noted that since a source electrode and a drain electrode of a thin film transistor may generally be used interchangeably, in the present disclosure, expressions such as first electrode and second electrode of thin film transistor are used. It should be understood that, a "first electrode" of the thin film transistor may refer to one of the source electrode and the drain electrode of the thin film transistor, and a "second electrode" of the thin film transistor may refer to the other one of the source electrode and the drain electrode of the thin film transistor.

In the present disclosure, unless otherwise specified, expressions "disposed continuously" and "extending continuously" refer to that two regions, parts or components extend, connect or dispose continuously and without interruption, that is, the two regions, parts or components form an integral structure, and there is no disconnection between the two regions, parts or components.

The embodiments of the present disclosure provide a display substrate, including: a base substrate; a plurality of gate lines and a plurality of data lines on the base substrate, each gate line extends in a row direction, each data line extends in a column direction, and the plurality of gate lines and the plurality of data lines intersect to surround a plurality of pixels; a first thin film transistor and a second thin film transistor in each pixel on the base substrate, each of the first thin film transistor and the second thin film transistor includes a first electrode and a second electrode; and a pixel electrode in each pixel on the base substrate, the pixel electrode includes a pixel conductive layer, the first electrode is located in a layer different from a layer where the pixel conductive layer is located, and the second electrode is located in a layer different from the layer where the pixel conductive layer is located, wherein the first electrode of the first thin film transistor is electrically connected to the pixel conductive layer of the pixel electrode, the second electrode of the first thin film transistor is electrically connected to the first electrode of the second thin film transistor, and the second electrode of the second thin film transistor is electrically connected to the data line; and wherein an orthographic projection of a combination of the second electrode of the first thin film transistor and the first electrode of the second thin film transistor on the base substrate at least partially overlaps with an orthographic projection of the pixel conductive layer of the pixel electrode on the base substrate. With such the display substrate, the pixel electrode covers an area where the thin film transistor is located, and a coverage area of the pixel electrode is increased. In this way, at least an opening ratio of the pixel may be increased, thereby improving the display performance.

Figure 2:
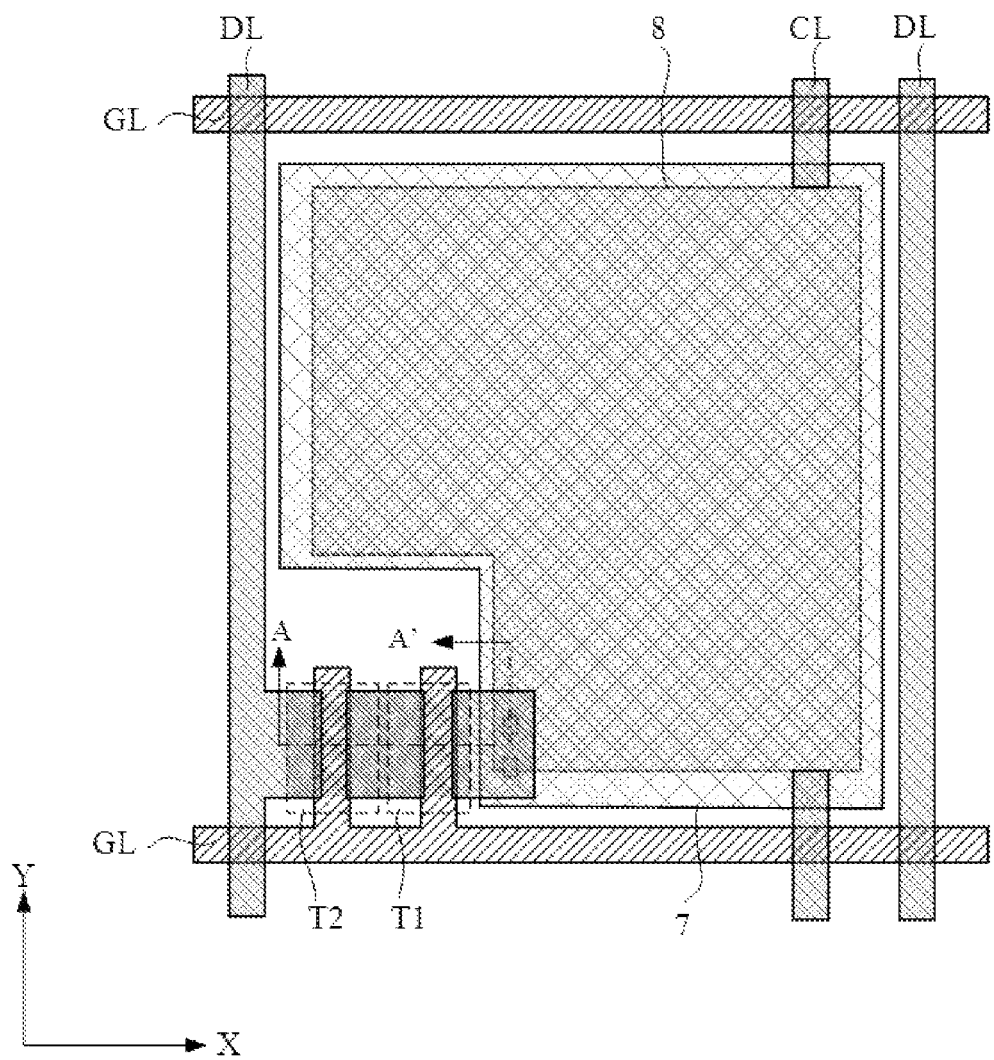
FIG. 2 is a schematic plan view of a pixel included in the display substrate in FIG. 1.
Figure 3A:
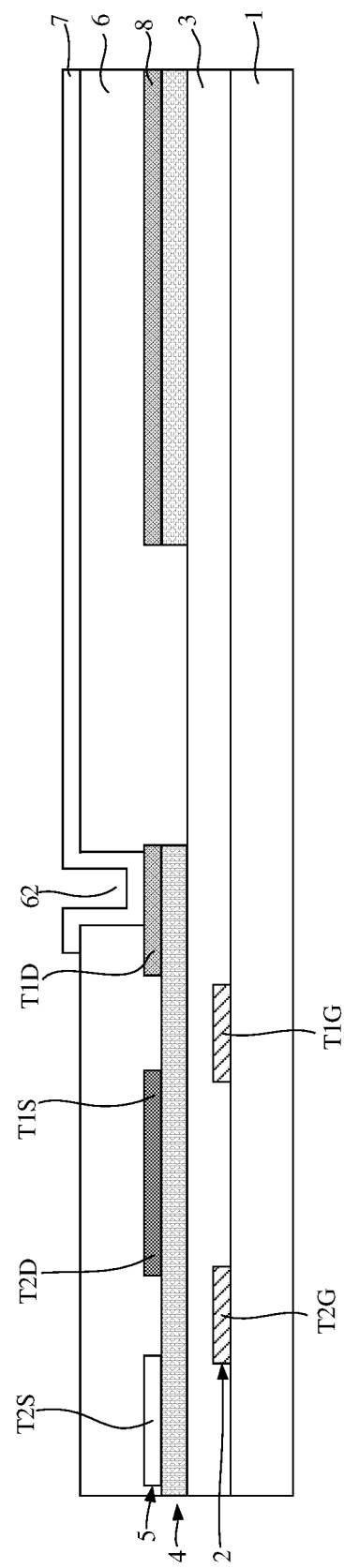
FIG. 3A is a cross-sectional view of the display substrate in the prior art taken along line AA' in FIG. 2.
Figure 3B:
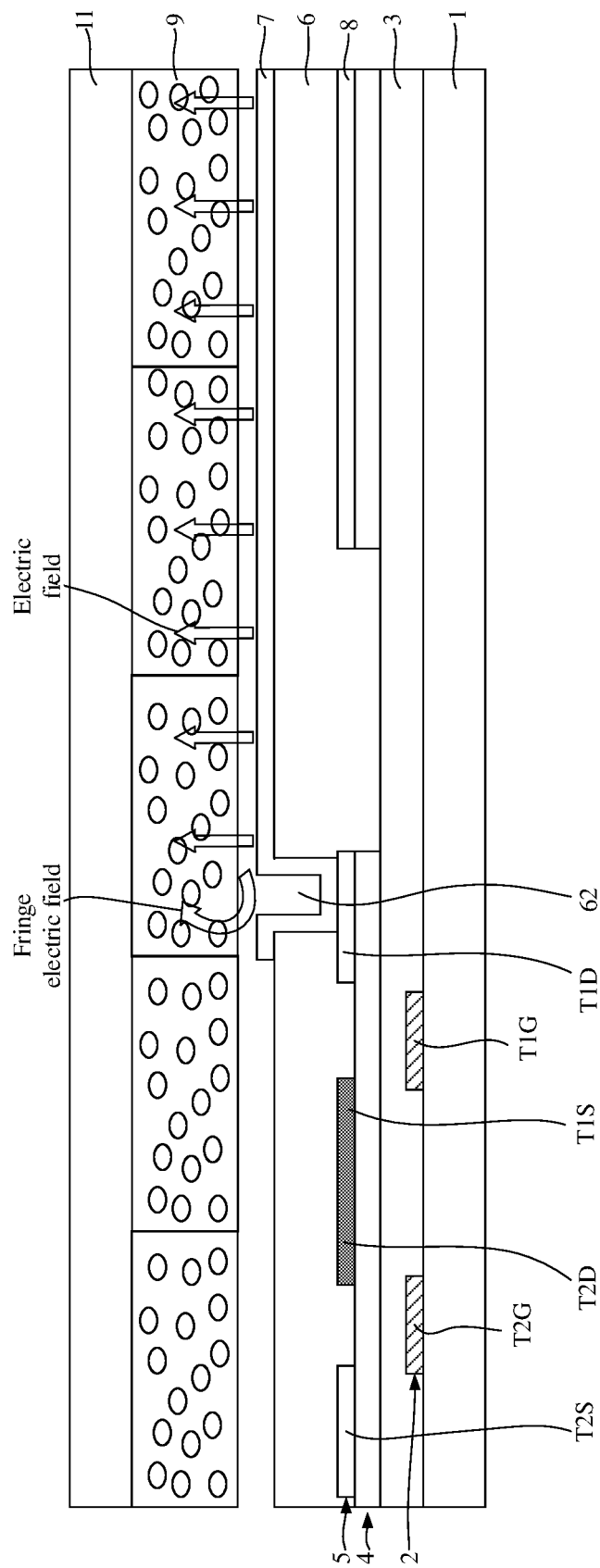
FIG. 3B is a cross-sectional view of a display device in the prior art.

FIG. 1 is a schematic plan view of a display substrate in the prior art, which schematically illustrates a plurality of (for example, 4) pixels included in the display substrate. FIG. 2 is a schematic plan view of a pixel included in the display substrate in FIG. 1. FIG. 3A is a cross-sectional view of the display substrate in the prior art taken along line AA' in FIG. 2. FIG. 3B is a cross-sectional view of a display device in the prior art.

For example, the display substrate may be a display substrate of an electronic paper display device, and the display substrate may be an array substrate of the electronic paper display device.

Referring to FIGS. 1 to 3A in combination, the display substrate may include a plurality of pixels P. In FIG. 1, the plurality of (for example, 4) pixels P are exemplarily shown. It should be understood that, the display substrate may include more pixels P. Specifically, the display substrate includes: a base substrate 1; and a plurality of gate lines GL, a plurality of data lines (or referred to as source lines) DL and a plurality of common electrode lines CL on the base substrate 1. The plurality of gate lines GL extend in parallel in a row direction X, the plurality of data lines DL extend in parallel in a column direction Y, the plurality of common electrode lines CL extend in parallel in the column direction Y, and each common electrode line CL is located between two adjacent data lines DL. The plurality of gate lines GL and the plurality of data lines DL are intersected to surround the plurality of pixels P.

The display substrate may include two thin film transistors in one pixel P. For ease of description, the two thin film transistors are referred to as a first thin film transistor T1 and a second thin film transistor T2, respectively, and the first thin film transistor T1 is farther away from a data line DL than the second thin film transistor T2. That is, in FIGS. 1 to 3A, the first thin film transistor T1 is located on a right side of the second thin film transistor T2.

Referring to FIGS. 2 and 3A, the first thin film transistor T1 includes a first source electrode T1S, a first gate electrode T1G and a first drain electrode T1D, and the second thin film transistor T2 includes a second source electrode T2S, a second gate electrode T2G and a second drain electrode T2D. The first drain electrode T1D of the first thin film transistor T1 is electrically connected to a pixel electrode. The first source electrode T1S of the first thin film transistor T1 and the second drain electrode T2D of the second thin film transistor T2 are an integral structure. A gate line GL is electrically connected to the first gate electrode T1G of the first thin film transistor T1 and the second gate electrode T2G of the second thin film transistor T2. For example, the gate line GL, the first gate electrode T1G and the second gate electrode T2G are an integral structure, that is, the gate line GL, the first gate electrode T1G and the second gate electrode T2G are a continuously extending integral structure. The second source electrode T2S of the second thin film transistor T2 is electrically connected to the data line DL.

It should be understood that the source electrode and the drain electrode of the thin film transistor may be interchanged. For example, the first source electrode of the first thin film transistor may be electrically connected to the pixel electrode, and the second drain electrode of the second thin film transistor may be electrically connected to the data line.

An electronic ink is controlled by two thin film transistors connected in series to achieve display, and the two thin film transistors connected in series may reduce a drain current and improve a display quality.

Continuing to refer to FIGS. 1 to 3A, the display substrate may include a first conductive layer 2, a gate insulating layer 3, an active layer 4, a second conductive layer 5, a passivation layer 6 and a pixel conductive layer 7 that are disposed on the base substrate 1.

The first conductive layer 2 may include the first gate electrode T1G of the first thin film transistor T1, the second gate electrode T2G of the second thin film transistor T2 and the gate line GL.

The gate insulating layer 3 is located on a side of the first conductive layer 2 away from the base substrate 1.

The active layer 4 is located on a side of the gate insulating layer 3 away from the base substrate 1. The active layer 4 may include a semiconductor material, such as amorphous silicon, polysilicon or metal oxide, and the like.

The second conductive layer 5 is located on a side of the active layer 4 away from the base substrate 1. The second conductive layer 5 may include: the first source electrode T1S and the first drain electrode T1D of the first thin film transistor T1, the second source electrode T2S and the second drain electrode T2D of the second thin film transistor T2, the data line DL, the common electrode Line CL and a common electrode 8.

The passivation layer 6 is located on a side of the second conductive layer 5 away from the base substrate 1. An orthographic projection of the passivation layer 6 on the base substrate 1 covers an orthographic projection of the second conductive layer 5 on the base substrate 1. The passivation layer 6 is made of an insulating material.

The pixel conductive layer 7 is located on a side of the passivation layer 6 away from the base substrate 1.

Referring to FIGS. 2 and 3A, the display substrate may further include a via hole 62 penetrating the passivation layer 6, the via hole 62 exposes a part of the first drain electrode T1D of the first thin film transistor T1. A part of the pixel conductive layer 7 may be filled in the via hole 62. In this way, the pixel conductive layer 7 is electrically connected to the first drain electrode T1D of the first thin film transistor T1. In this way, the pixel conductive layer 7 constitutes a part of the pixel electrode. In this way, an electrical connection between the pixel electrode and the first drain electrode T1D of the first thin film transistor T1 is achieved.

In this way, under a control of a gate line signal supplied by the gate line GL, a signal (for example, voltage) supplied by the data line DL may be transmitted to the pixel electrode.

Further, referring to FIGS. 1 and 2, the common electrode line CL may be electrically connected to the common electrode 8. For example, common electrodes 8 of the plurality of pixels P adjacent to each other in the column direction Y may be electrically connected by the common electrode line CL. In this way, a signal (for example, voltage) supplied by the common electrode line CL may be transmitted to the common electrode 8. Therefore, a storage capacitor may be formed between the pixel electrode (i.e, the pixel conductive layer 7) and the common electrode 8.

Referring to FIG. 3B, an electronic ink layer 9 is disposed on a side of a pixel conductive layer 7 away from a base substrate 1, for example, the electronic ink layer 9 may be disposed on a counter substrate 11. It should be understood that, an upper electrode is also disposed on the counter substrate 11. The electronic ink layer 9 may include a plurality of microcapsules, and a microcapsule may include charged particles. By controlling an electric field between the pixel electrode and the upper electrode, the charged particles may be driven to move in the microcapsules. In this way, by adjusting colors of the charged particles in the microcapsules, the electronic ink may display patterns and colors.

In the exemplary embodiments of FIG. 1 to FIG. 3A and FIG. 3B, except for the first drain electrode T1D of the first thin film transistor T1, an orthographic projection of the pixel conductive layer 7 on the base substrate 1 does not overlap with other parts of the first thin film transistor T1 and the second thin film transistor T2 (including the first gate electrode T1G and the first source electrode T1S of the first thin film transistor T1, and the second gate electrode T2G, the second source electrode T2S and the second drain electrode T2D of the second thin film transistor T2). That is, the orthographic projection of the pixel conductive layer 7 on the base substrate 1 does not cover most of an orthographic projections of the first thin film transistor T1 and the second thin film transistor T2 on the base substrate 1.

In this way, as shown in FIG. 2, a shape of the pixel P is rectangular or approximately rectangular (for example, a rounded rectangle). However, the orthographic projection of the pixel conductive layer 7 on the base substrate 1 is not a complete rectangle and has a gap in an area where the two thin film transistors are located. For example, in one example, an area of the gap occupies about 13% of an area of the entire pixel P. Due to the existence of the gap, it is not conducive to increasing the opening ratio of pixel.

Further, referring to FIGS. 2, 3A and 3B in combination, since there is no pixel electrode above the area where the two thin film transistors are located, there is no electric field to drive the charged particles of the electronic ink layer in the area. Or, even if there is an electric field, the electric field is also a fringe electric field generated at an edge of the pixel electrode. A driving ability of the fringe electric field is weak, so that a dispersion degree of the charged particles in the electronic ink layer is poor. Under low temperature conditions, the charged particles in the electronic ink layer are particularly sensitive to the gap, which may easily lead to undesirable phenomena such as blurred handwriting on the display screen of the electronic paper.

Hereinafter, some exemplary embodiments of the present disclosure will be described with reference to the drawings.

Figure 4:
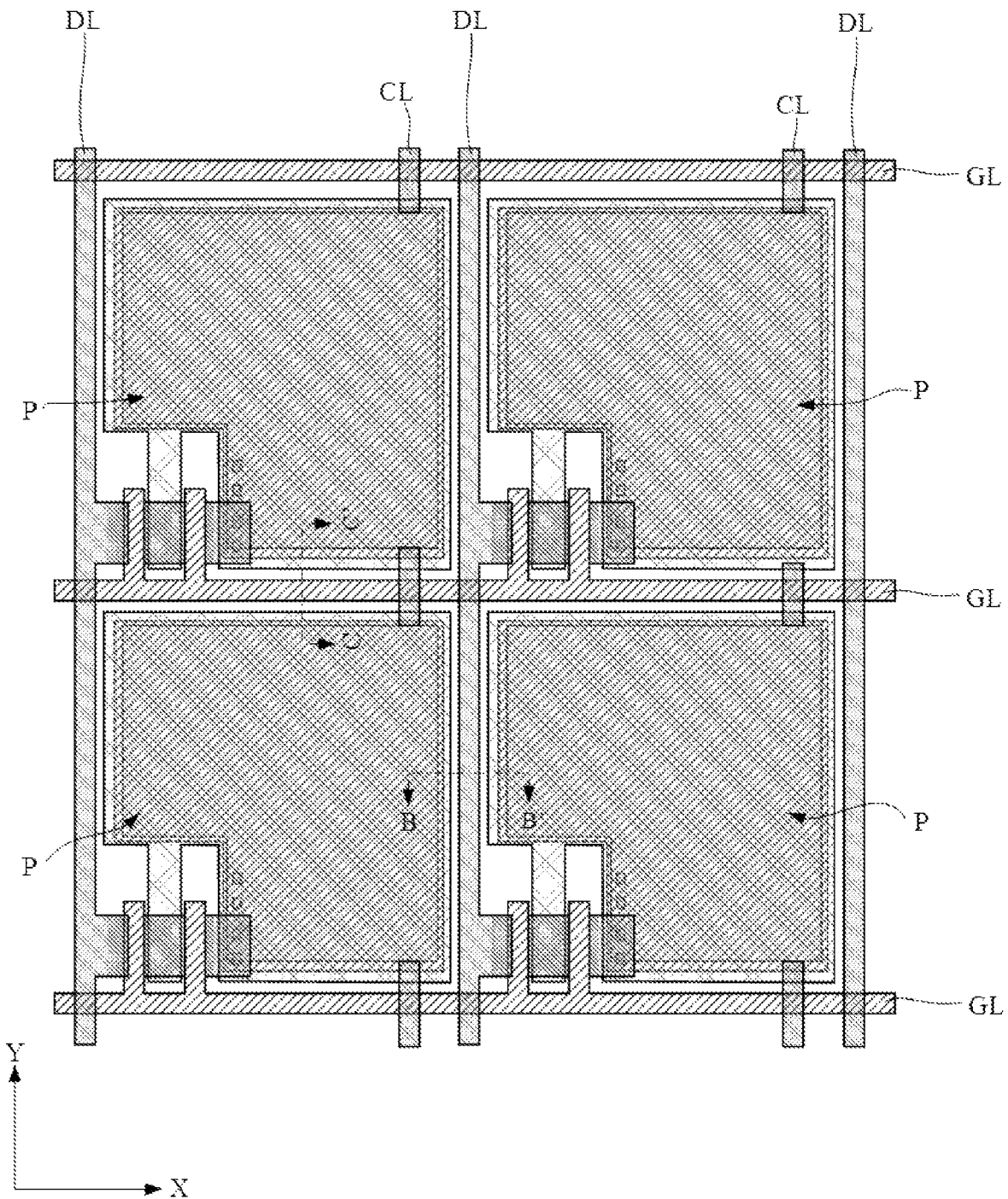
FIG. 4 is a schematic plan view of a display substrate according to some exemplary embodiments of the present disclosure, which schematically illustrates a plurality of pixels (for example, 4) included in the display substrate.
Figure 5:
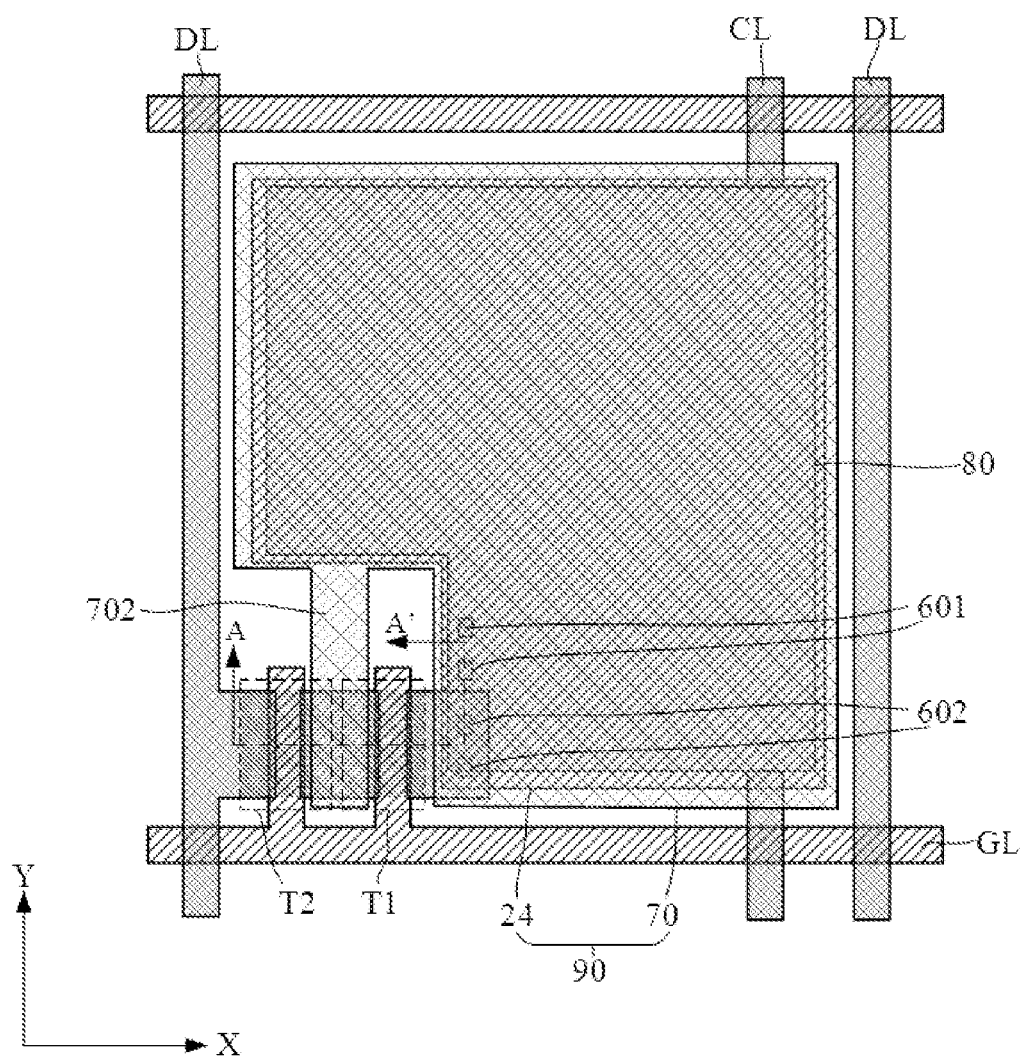
FIG. 5 is a schematic plan view of a pixel included in the display substrate in FIG. 4.
Figure 6A:
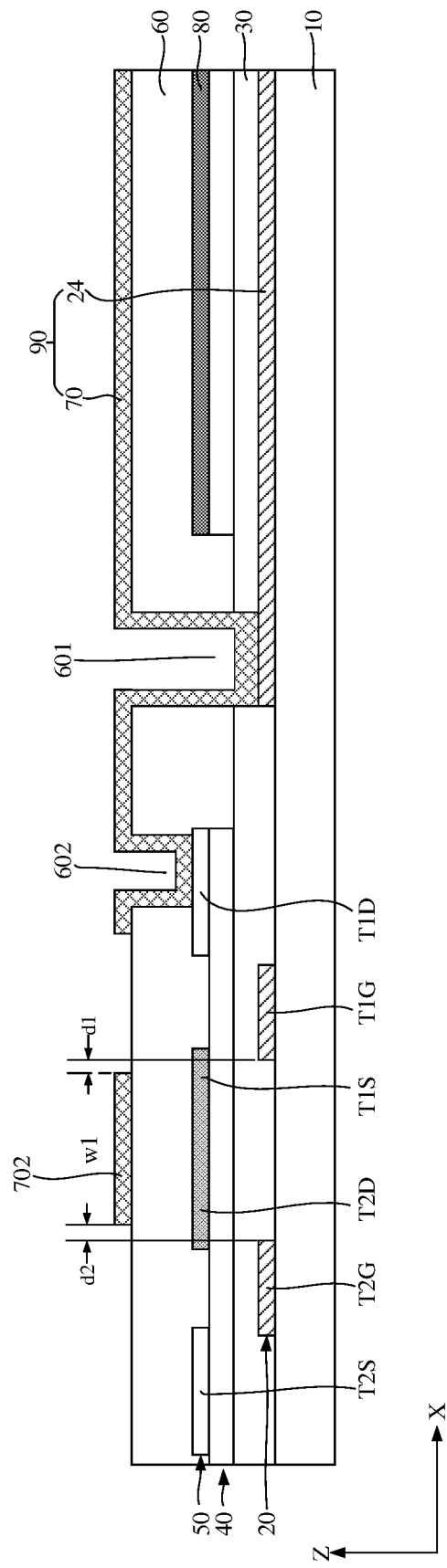
FIG. 6A is a cross-sectional view of the display substrate taken along line AA' in FIG. 5 according to some exemplary embodiments of the present disclosure.
Figure 6B:
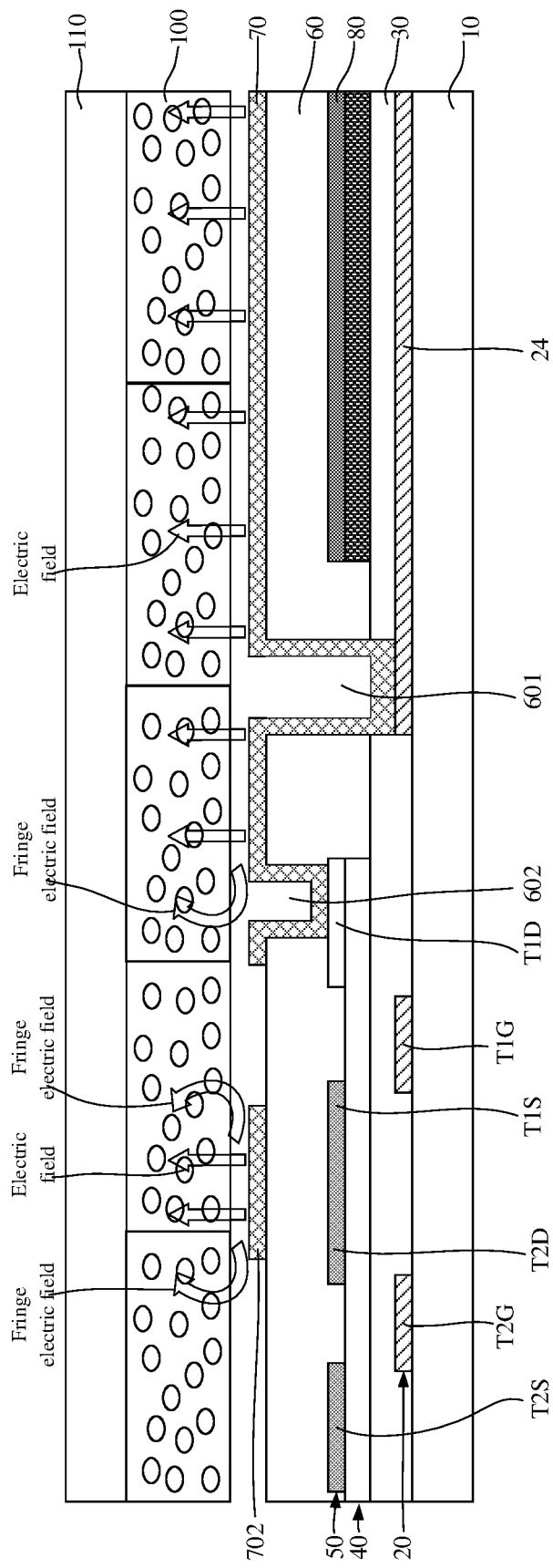
FIG. 6B is a cross-sectional view of a display device according to some exemplary embodiments of the present disclosure.

FIG. 4 is a schematic plan view of a display substrate according to some exemplary embodiments of the present disclosure, which schematically illustrates a plurality of (for example, 4) pixels included in the display substrate. FIG. 5 is a schematic plan view of a pixel included in the display substrate in FIG. 4. FIG. 6A is a cross-sectional view of the display substrate taken along line AA' in FIG. 5 according to some exemplary embodiments of the present disclosure. FIG. 6B is a cross-sectional view of a display device according to some exemplary embodiments of the present disclosure;

For example, the display substrate may be a display substrate of an electronic paper display device, and the display substrate may be an array substrate of an electronic paper display device. Correspondingly, the display device may be an electronic paper display device.

Referring to FIGS. 4 to 6A in combination, the display substrate may include a plurality of pixels P. In FIG. 4, the plurality of (for example, 4) pixels P are exemplarily shown. It should be understood that, the display substrate may include more pixels P. Specifically, the display substrate includes: a base substrate 10; a plurality of gate lines GL, a plurality of data lines (or referred to as source lines) DL and a plurality of common electrode lines CL on the base substrate 10. The plurality of gate lines GL extend in parallel in the row direction X, the plurality of data lines DL extend in parallel in the column direction Y, the plurality of common electrode lines CL extend in parallel in the column direction Y, and each common electrode line CL is located between two adjacent data lines DL. The plurality of gate lines GL and the plurality of data lines DL are intersected to surround the plurality of pixels P.

It should be noted that, in the illustrated embodiment, the row direction X and the column direction Y are perpendicular to each other. However, the embodiments of the present disclosure are not limited to this, and the row direction X and the column direction Y may be any two directions that intersect at other angles in a plane on which the pixel is arranged.

In the exemplary embodiment of the present disclosure, the display substrate may include two thin film transistors in one pixel P, that is, a driving circuit of each pixel may include two thin film transistors. For ease of description, the two thin film transistors are referred to as a first thin film transistor T1 and a second thin film transistor T2, respectively, and the first thin film transistor T1 is farther away from a data line DL than the second thin film transistor T2. That is, in FIGS. 5 and 6A, the first thin film transistor T1 is located on a right side of the second thin film transistor T2.

Referring to FIGS. 5 and 6A, the first thin film transistor T1 includes a first source electrode T1S, a first gate electrode T1G and a first drain electrode T1D, and the second thin film transistor T2 includes a second source electrode T2S, a second gate electrode T2G and a second drain electrode T2D. The first drain electrode T1D of the first thin film transistor T1 is electrically connected to a pixel electrode. The first source electrode T1S of the first thin film transistor T1 and the second drain electrode T2D of the second thin film transistor T2 are an integral structure. A gate line GL is electrically connected to the first gate electrode T1G of the first thin film transistor T1 and the second gate electrode T2G of the second thin film transistor T2. For example, the gate line GL, the first gate electrode T1G and the second gate electrode T2G are an integral structure, that is, the gate line GL, the first gate electrode T1G and the second gate electrode T2G are a continuously extending integral structure. The second source electrode T2S of the second thin film transistor T2 is electrically connected to the data line DL.

It should be understood that, the source electrode and the drain electrode of the thin film transistor may be interchanged. For example, the first source electrode of the first thin film transistor may be electrically connected to the pixel electrode, and the second drain electrode of the second thin film transistor may be electrically connected to the data line.

In the exemplary embodiments of the present disclosure, an electronic ink is controlled by two thin film transistors connected in series to achieve display, and the two thin film transistors connected in series may reduce a drain current and improve a display quality.

The base substrate 10 may be a rigid substrate, such as a glass substrate; or, the base substrate 10 may be a flexible substrate, such as a polyimide (PI) substrate.

Continuing to refer to FIGS. 4 to 6A, the display substrate may include a first conductive layer 20, a gate insulating layer 30, an active layer 40, a second conductive layer 50, a passivation layer 60 and a pixel conductive layer 70 that are disposed on the base substrate 10.

The first conductive layer 20 may include the first gate electrode T1G of the first thin film transistor T1, the second gate electrode T2G of the second thin film transistor T2, the gate line GL and a gate conductive layer 24. That is, the first gate electrode T1G of the first thin film transistor T1, the second gate electrode T2G of the second thin film transistor T2, the gate line GL and the gate conductive layer 24 are located in a same layer made of a gate metal material. For example, the gate electrodes T1G, T2G and the gate line GL are a continuously extending structure, the gate conductive layer 24 and the continuously extending structure are disposed at an interval and insulated from each other.

The gate insulating layer 30 is located on a side of the first conductive layer 20 away from the base substrate 10. An orthographic projection of gate insulating layer 30 on base substrate 10 covers an orthographic projection of each of the first gate electrode T1G of the first thin film transistor T1, the second gate electrode T2G of the second thin film transistor T2, the gate line GL and the gate conductive layer 24 on the base substrate 10.

The active layer 40 is located on a side of the gate insulating layer 30 away from the base substrate 1. The active layer 4 may include a semiconductor material, such as amorphous silicon, polysilicon or metal oxide, and the like.

The second conductive layer 50 is located on a side of the active layer 40 away from the base substrate 1. The second conductive layer 5 may include: the first source electrode T1S and the first drain electrode T1D of the first thin film transistor T1, the second source electrode T2S and the second drain electrode T2D of the second thin film transistor T2, the data line DL, the common electrode Line CL and a common electrode 80. That is, the first source electrode T1S and the first drain electrode T1D of the first thin film transistor T1, the second source electrode T2S and the second drain electrode T2D of the second thin film transistor T2, the data line DL, the common electrode line CL and the common electrode 80 are all located in a same layer made of a source and drain metal material. In some examples, an orthographic projection of a combination of all the components (for example, the first source electrode T1S and the first drain electrode T1D of the first thin film transistor T1, the second source electrode T2S and the second drain electrode T2D of the second thin film transistor T2, the data line DL, the common electrode line CL and the common electrode 80) in the second conductive layer 50 on the base substrate 10 falls within an orthographic projection of the active layer 40 on the base substrate 10.

The passivation layer 60 is located on a side of the second conductive layer 50 away from the base substrate 10. An orthographic projection of the passivation layer 60 on the base substrate 10 covers an orthographic projection of the second conductive layer 50 on the base substrate 10. The passivation layer 60 is made of an insulating material.

The pixel conductive layer 70 is located on a side of the passivation layer 6 away from the base substrate 10. The pixel conductive layer 70 is made of a transparent conductive material (for example, ITO).

Referring to FIGS. 5 and 6A, the display substrate may further include a via hole 602 penetrating the passivation layer 60, the via hole 602 exposes a part of the first drain electrode T1D of the first thin film transistor T1. For example, two via holes 602 are disposed in each pixel P. A part of the pixel conductive layer 7 may be filled in the via hole 62. In this way, the pixel conductive layer 7 is electrically connected to the first drain electrode T1D of the first thin film transistor T1. Since two via holes 602 are disposed in each pixel P, it may be ensured that there is a reliable electrical connection between the pixel conductive layer 70 and the first drain electrode T1D of the first thin film transistor T1. In this way, an electrical connection between a pixel electrode 90 and the first drain electrode T1D of the first thin film transistor T1 is achieved.

Continuing to refer to FIGS. 5 and 6A, the display substrate may further include a via hole 601 penetrating both the gate insulating layer 30 and the passivation layer 60, the via hole 601 exposes a part of the gate conductive layer 24. For example, two via holes 601 are disposed in each pixel P. A part of the pixel conductive layer 70 may be filled in the via hole 601, In this way, the pixel conductive layer 70 and the gate conductive layer 24 are electrically connected. Since two via holes 601 are disposed in each pixel P, it may be ensured that there is a reliable electrical connection between the pixel conductive layer 70 and the gate conductive layer 24. In this way, the pixel conductive layer 70 made of the transparent conductive material and the gate conductive layer 24 made of the gate metal material are electrically connected to form the pixel electrode 90 of the display substrate.

In this way, under a control of a gate line signal supplied by the gate line GL, a signal (for example, voltage) supplied by the data line DL may be transmitted to the pixel electrode 90.

Further, referring to FIGS. 4 and 5, the common electrode line CL may be electrically connected to the common electrode 80. For example, common electrodes 80 of the plurality of pixels P adjacent to each other in the column direction Y may be electrically connected by the common electrode line CL. In this way, a signal (for example, voltage) supplied by the common electrode line CL may be transmitted to the common electrode 80. Therefore, a storage capacitor may be formed between the pixel electrode 90 and the common electrode 80.

Referring to FIG. 6B, an electronic ink layer 100 is disposed on a side of a pixel conductive layer 70 away from a base substrate 10, for example, the electronic ink layer 100 may be disposed on a counter substrate 110. It should be understood that an upper electrode is also disposed on the counter substrate 110. The electronic ink layer 100 may include a plurality of microcapsules, and a microcapsule may include charged particles. By controlling an electric field between the pixel electrode 90 and the upper electrode, the charged particles may be driven to move in the microcapsules. In this way, by adjusting colors of the charged particles in the microcapsules, the electronic ink may display patterns and colors.

In the exemplary embodiments of FIG. 4 to FIG. 6A and FIG. 6B, an orthographic projection of the pixel conductive layer 70 on the base substrate 10 covers an orthographic projection of the gate conductive layer 24 on the base substrate 10, and the orthographic projection of the pixel conductive layer 70 on the base substrate 10 covers an orthographic projection of the common electrode 80 on the base substrate 10. That is, a coverage area of the pixel conductive layer 70 is set to be relatively large to increase the opening ratio of each pixel, so that the display performance may be improved.

In the exemplary embodiments of FIGS. 4 to 6A and 6B, the orthographic projection of the pixel conductive layer 70 on the base substrate 10 at least partially overlaps with an orthographic projection of the first drain electrode T1D of the first thin film transistor T1 on the base substrate 10. In this way, an electrical connection between the pixel conductive layer 70 and the drain electrode of the thin film transistor may be achieved.

An orthographic projection of a combination of the first source electrode T1S of the first thin film transistor T1 and the second drain electrode T2D of the second thin film transistor T2 on the base substrate 10 at least partially overlaps with the orthographic projection of the pixel conductive layer 70 on the base substrate 10. In other words, the pixel conductive layer 70 includes a protrusion 702. The orthographic projection of the combination of the first source electrode T1S of the first thin film transistor T1 and the second drain electrode T2D of the second thin film transistor T2 on the base substrate 10 at least partially overlaps with an orthographic projection of the protrusion 702 on the base substrate 10. In some embodiments, the first source electrode T1S of the first thin film transistor T1 and the second drain electrode T2D of the second thin film transistor T2 are a continuously extending integral structure, and the orthographic projection of the protrusion 702 on the base substrate 10 at least partially overlaps with the orthographic projection of the continuously extending integral structure on the base substrate 10.

Specifically, the first gate electrode T1G of the first thin film transistor T1 and the second gate electrode T2G of the second thin film transistor T2 are disposed at an interval in the row direction X. The orthographic projection of the protrusion 702 on the base substrate 10 falls with an orthographic projection of a gap between the first gate electrode T1G of the first thin film transistor T1 and the second gate electrode T2G of the second thin film transistor T2 on the base substrate 10.

Referring to FIGS. 5 and 6A, the orthographic projection of the pixel conductive layer 70 on the base substrate 10 does not overlap with the first gate electrode T1G of the first thin film transistor T1 and the second gate electrode T2G of the second thin film transistor T2.

Specifically, the orthographic projection of the protrusion 702 on the base substrate 10 does not overlap with the first gate electrode T1G of the first thin film transistor T1 and the second gate electrode T2G of the second thin film transistor T2. As shown in FIGS. 5 and 6A, the orthographic projection of the protrusion 702 on the base substrate 10 and the first gate electrode T1G of the first thin film transistor T1 are disposed at a predetermined distance in the row direction X. For ease of description, the predetermined distance is referred to as a first predetermined distance, as shown by d1 in FIG. 6A. The orthographic projection of the protrusion 702 on the base substrate 10 and the second gate electrode T2G of the second thin film transistor T2 are disposed at a predetermined distance in the row direction X. For ease of description, the predetermined distance is referred to as a second predetermined distance, as shown in d2 in FIG. 6A. For example, the first predetermined distance d1 may be equal to the second predetermined distance d2.

For example, the orthographic projection of the protrusion 702 on the base substrate 10 may have a rectangular or approximately rectangular shape (for example, a rounded rectangle), and a width of the orthographic projection of the protrusion 702 on the base substrate 10 in the row direction X is indicated as w1.

In some exemplary embodiments, considering factors such as process fluctuations, the width w1 is set to be 3.4 to 6.5 micrometers. Correspondingly, the first predetermined distance d1 and the second predetermined distance d2 may be set to 1.75 to 3.3 micrometers. For example, when the width w1 is 3.4 micrometers, both the first predetermined distance d1 and the second predetermined distance d2 are 3.3 micrometers; when the width w1 is 6.5 micrometers, both the first predetermined distance d1 and the second predetermined distance d2 are 1.75 micrometers. That is, by disposing the protrusion 702 and the gate electrodes of the two thin film transistors at an interval and setting the first predetermined distance d1 and the second predetermined distance d2 to be 1.75 to 3.3 micrometers, an area of the protrusion covering the gap between the gate electrodes of the two thin film transistors may be made as large as possible, while even if the factor of process fluctuation is considered, the protrusion still does not overlap with the gate electrode.

In this way, the coverage area of the pixel conductive layer 70 may be increased. That is, the coverage area of the pixel electrode 90 is increased to further increase the opening ratio of each pixel, so that the display performance may be improved. Moreover, since the pixel conductive layer 70 does not overlap with the gate electrodes of the two thin film transistors, the thin film transistor may maintain a small drain current, and an influence of a gate line voltage change on the pixel electrode may be reduced, so that the electronic paper keeps pulling the pixel electrode while the electronic paper keeps display.

Further, referring to FIG. 6B, since a part of the pixel electrode overlaps with the area where the two thin film transistors are located, an electric field between the pixel electrode and the common electrode may act on the area where the two thin film transistors are located. As shown in FIG. 6B, there are also an electric field and a fringe electric field in the area, the electric field may drive the charged particles in the electronic ink layer located in the area. In this way, undesirable phenomena such as blurred handwriting in the area may be solved, and the display quality may be improved.

It should be noted that referring back to FIGS. 5 and 6A, the orthographic projection of the pixel conductive layer 70 on the base substrate 10 does not overlap with an orthographic projection of the second source electrode T2S of the second thin film transistor T2 on the base substrate 10, and the orthographic projection of the pixel conductive layer 70 on the base substrate 10 does not overlap with an orthographic projection of the data line DL on the base substrate 10. In addition, the orthographic projection of the pixel conductive layer 70 on the base substrate 10 does not overlap with an orthographic projection of the gate line GL on the base substrate 10.

For example, in the embodiments shown in FIGS. 1 to 6A, a width of a channel region of each of the first thin film transistor T1 and the second thin film transistor T2 may be 40 micrometers and a length of thereof may be 4.5 micrometers. The first thin film transistor T1 and the second thin film transistor T2 connected in series may be regarded as a thin film transistor with a double gate structure. An aspect ratio of the channel of the thin film transistor with the double gate structure may be 40/(4.5+4.5). Under conditions of a same pixel size and a same thin film transistor size, the display substrate according to the embodiment shown in FIGS. 1 to 3A and the embodiment shown in FIGS. 4 to 6A may have following performance parameters.

TABLE 1

Comparison table of performance parameters of display substrate

|  | Embodiment shown in FIG. 1 to 3A | Embodiment shown in FIG. 4 to 6A |
|---|---|---|
| Opening radio | 71.77% | 77% |
| On-state current $I_{on}$ | 3.22 μA | 3.23 μA |
| Off-state current $I_{off}$ | 0.41 pA | 0.83 pA |

Through comparison, it is found that in the embodiment shown in FIGS. 4 to 6A, the coverage area of the pixel electrode is increased by adding the protrusion 702, thereby greatly increasing the opening ratio of the pixel. While the on-state current Ion of the thin film transistor remains basically unchanged, and the off-state current Ioff is slightly increased, but the off-state current Ioff is still within a standard range of electronic paper display products. That is, the display substrate provided by the embodiments of the present disclosure may greatly increase the opening ratio while maintaining the driving performance, thereby improving the display quality.

Figure 7:
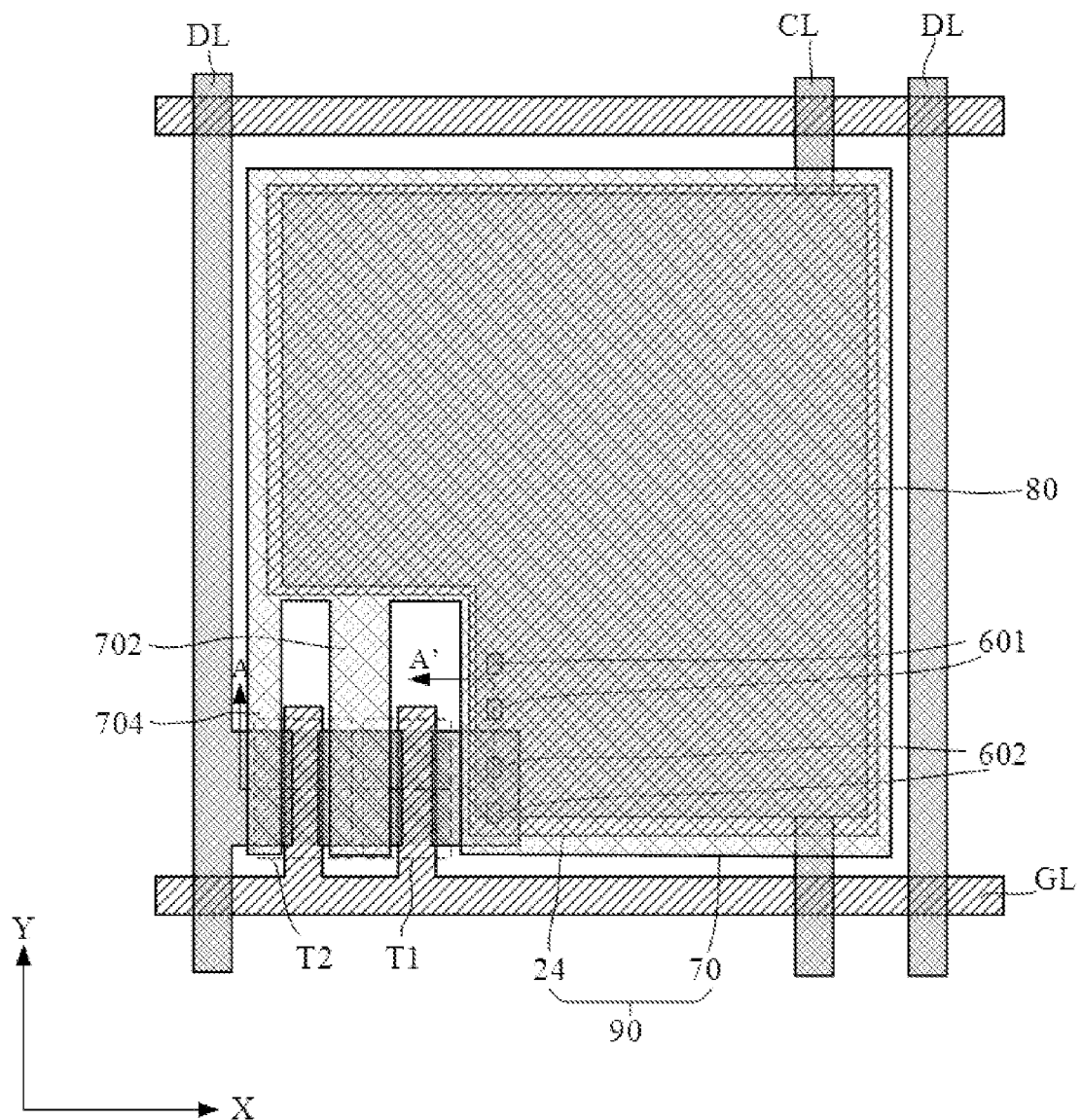
FIG. 7 is a schematic plan view of a pixel included in a display substrate according to some exemplary embodiments of the present disclosure.
Figure 8:
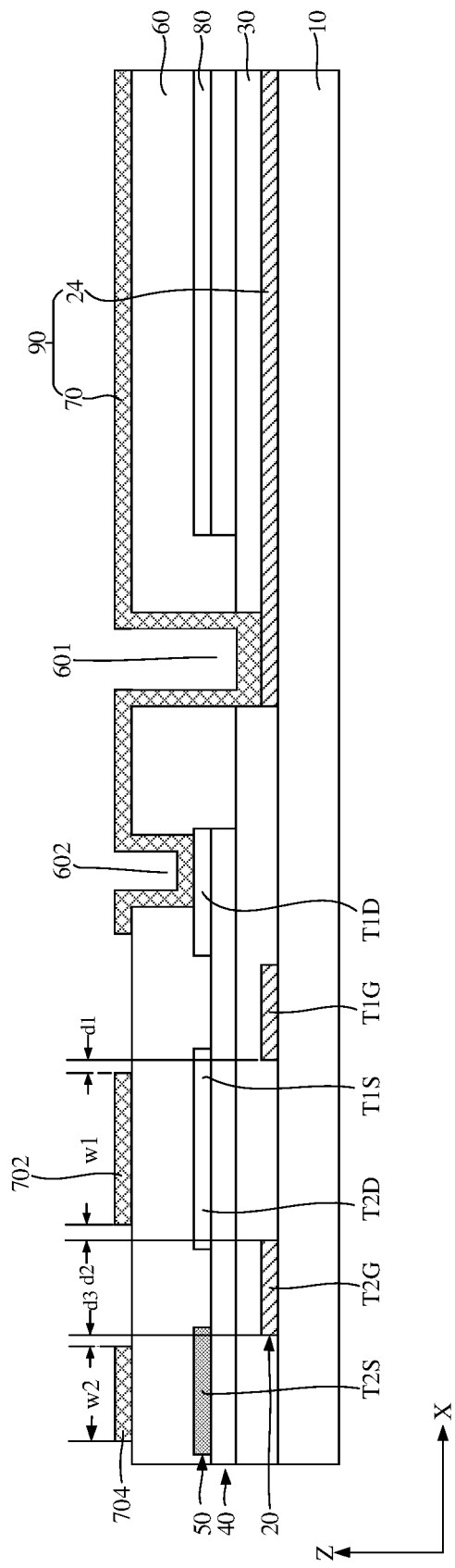
FIG. 8 is a cross-sectional view of the display substrate taken along line AA' in FIG. 7 according to some exemplary embodiments of the present disclosure.

FIG. 7 is a schematic plan view of a pixel included in a display substrate according to some exemplary embodiments of the present disclosure. FIG. 8 is a cross-sectional view of the display substrate taken along line AA' in FIG. 7 according to some exemplary embodiments of the present disclosure. The following will mainly describe differences between the embodiment shown in FIG. 7 and FIG. 8 with respect to the embodiment shown in FIG. 5 and FIG. 6A, and other similarities may refer to the above descriptions.

Referring to FIGS. 7 and 8, an orthographic projection of a pixel conductive layer 70 on a base substrate 10 at least partially overlaps with an orthographic projection of a first drain electrode T1D of a first thin film transistor T1 on the base substrate 10.

An orthographic projection of a combination of a first source electrode T1S of the first thin film transistor T1 and a second drain electrode T2D of a second thin film transistor T2 on the base substrate 10 at least partially overlaps with the orthographic projection of the pixel conductive layer 70 on the base substrate 10. In other words, the pixel conductive layer 70 includes a protrusion 702, the orthographic projection of the combination of the first source electrode T1S of the first thin film transistor T1 and the second drain electrode T2D of the second thin film transistor T2 on the base substrate 10 at least partially overlaps with an orthographic projection of the protrusion 702 on the base substrate 10. Specifically, a first gate electrode T1G of the first thin film transistor T1 and a second gate electrode T2G of the second thin film transistor T2 are disposed at an interval in a row direction X, and the orthographic projection of the protrusion 702 on the base substrate 10 falls within an orthographic projection of a gap between the first gate electrode T1G of the first thin film transistor T1 and the second gate electrode T2G of the second thin film transistor T2 on the base substrate 10.

The orthographic projection of the pixel conductive layer 70 on the base substrate 10 at least partially overlaps with an orthographic projection of a second source electrode T2S of the second thin film transistor T1 on the base substrate 10. In other words, the pixel conductive layer 70 includes a protrusion 704, an orthographic projection of the protrusion 704 on the base substrate 10 at least partially overlaps with an orthographic projection of the second source electrode T2S of the second thin film transistor T1 on the base substrate 10. Specifically, the second gate electrode T2G of the second thin film transistor T2 and the data line DL are disposed at an interval in the row direction X, and the orthographic projection of the protrusion 704 on the base substrate 10 falls within an orthographic projection of a gap between the second gate electrode T2G of the second thin film transistor T2 and the data line DL on the base substrate 10.

The orthographic projection of the pixel conductive layer 70 on the base substrate 10 does not overlap with the first gate layer T1G of the first layer T1 and the second gate layer T2G of the second layer T2. Specifically, the orthographic projection of any one of the protrusion 702 and the protrusion 704 on the base substrate 10 does not overlap with the orthographic projections of any one of the first gate electrode T1G of the first thin film transistor T1 and the second gate electrode T2G of the second thin film transistor T2 on the base substrate 10. As shown in FIG. 7, the orthographic projection of the protrusion 702 on the base substrate 10 and the first gate electrode T1G of the first thin film transistor T1 are disposed at a predetermined distance in the row direction X. For ease of description, the predetermined distance is referred to as a first predetermined distance, as shown by d1 in FIG. 8. The orthographic projection of the protrusion 702 on the base substrate 10 and the second gate electrode T2G of the second thin film transistor T2 are disposed at a predetermined distance in the row direction X. For ease of description, the predetermined distance is referred to as a second predetermined distance, as shown in d2 in FIG. 8. For example, the first predetermined distance d1 may be equal to the second predetermined distance d2. The orthographic projection of the protrusion 704 on the base substrate 10 and the second gate electrode T2G of the second thin film transistor T2 are disposed at a predetermined distance in the row direction X. For ease of description, the predetermined distance is referred to as a third predetermined distance, as shown in d3 in FIG. 8.

For example, the orthographic projection of the protrusion 702 on the base substrate 10 may have a rectangular or approximately rectangular shape (for example, a rounded rectangle), and a width of the orthographic projection of the protrusion 702 on the base substrate 10 in the row direction X is indicated as a first width w1. The orthographic projection of the protrusion 704 on the base substrate 10 may have a rectangular shape, and a width of the orthographic projection of the protrusion 704 on the base substrate 10 in the row direction X is indicated as a second width w2.

In some exemplary embodiments, considering factors such as process fluctuations, the first width w1 is set to be 3.4 to 6.5 micrometers. Correspondingly, both the first predetermined distance d1 and the second predetermined distance d2 may be set to 1.75 to 3.3 micrometers. For example, when the first width w1 is 3.4 micrometers, both the first predetermined distance d1 and the second predetermined distance d2 are 3.3 micrometers; when the first width w1 is 4.5 micrometers, both the first predetermined distance d1 and the second predetermined distance d2 are 2.75 micrometers; when the first width w1 is 6.5 micrometers, both the first predetermined distance d1 and the second predetermined distance d2 are 1.75 micrometers.

In some exemplary embodiments, considering factors such as process fluctuations, the second width w2 is set to be 3.4 to 4.4 micrometers. Correspondingly, the third predetermined distance d3 may be set to 1.75 to 2.75 micrometers. For example, when the second width w2 is 3.4 micrometers, the third predetermined distance d3 is 2.75 micrometers;

when the second width w2 is 4.4 micrometers, the third predetermined distance d3 is 1.75 micrometers.

In this embodiment, by disposing the protrusion 702 and the protrusion 704 and the gate electrodes of two thin film transistors at an interval, and the first predetermined distance d1 and the second predetermined distance d2 are set to 1.75 to 3.3 micrometers and the third predetermined distance d3 is set to 1.75 to 2.75 micrometers, so as to make an area of the two protrusions covering the two thin film transistors excluding the gate electrodes as large as possible, while even if the factor of process fluctuation is considered, the two protrusions still do not overlap with the gate electrodes.

In this way, the coverage area of the pixel conductive layer 70 may be further increased. That is, the coverage area of the pixel electrode 90 is further increased to further increase the opening ratio of each pixel, so that the display performance may be improved. Moreover, since the pixel conductive layer 70 does not overlap with the gate electrodes of the two thin film transistors, the thin film transistor may maintain a small drain current, and an influence of a gate line voltage change on the pixel electrode may be reduced, so that the electronic paper keeps pulling the pixel electrode while the electronic paper keeps display.

For example, in the embodiments shown in FIGS. 7 to 8, a width of a channel region of each of the first thin film transistor T1 and the second thin film transistor T2 may be 40 micrometers and a length of thereof may be 4.5 micrometers. The first thin film transistor T1 and the second thin film transistor T2 connected in series may be regarded as a thin film transistor with a double gate structure. An aspect ratio of the channel of the thin film transistor with the double gate structure may be 40/(4.5+4.5). Under conditions of a same pixel size and a same thin film transistor size, the opening ratio of the pixel may be increased to 78%. It may be seen that the opening ratio may be further improved.

It should be noted that in this embodiment, an on-state current Ion of the thin film transistor is slightly increased compared to the on-state current Ion of the thin film transistor in the embodiments shown in FIGS. 4 to 6A; an off-state current Ioff of the thin film transistor in this embodiment increases significantly compared to the off-state current Ioff of the thin film transistor in the embodiment shown in FIGS. 4 to 6A.

Figure 9:
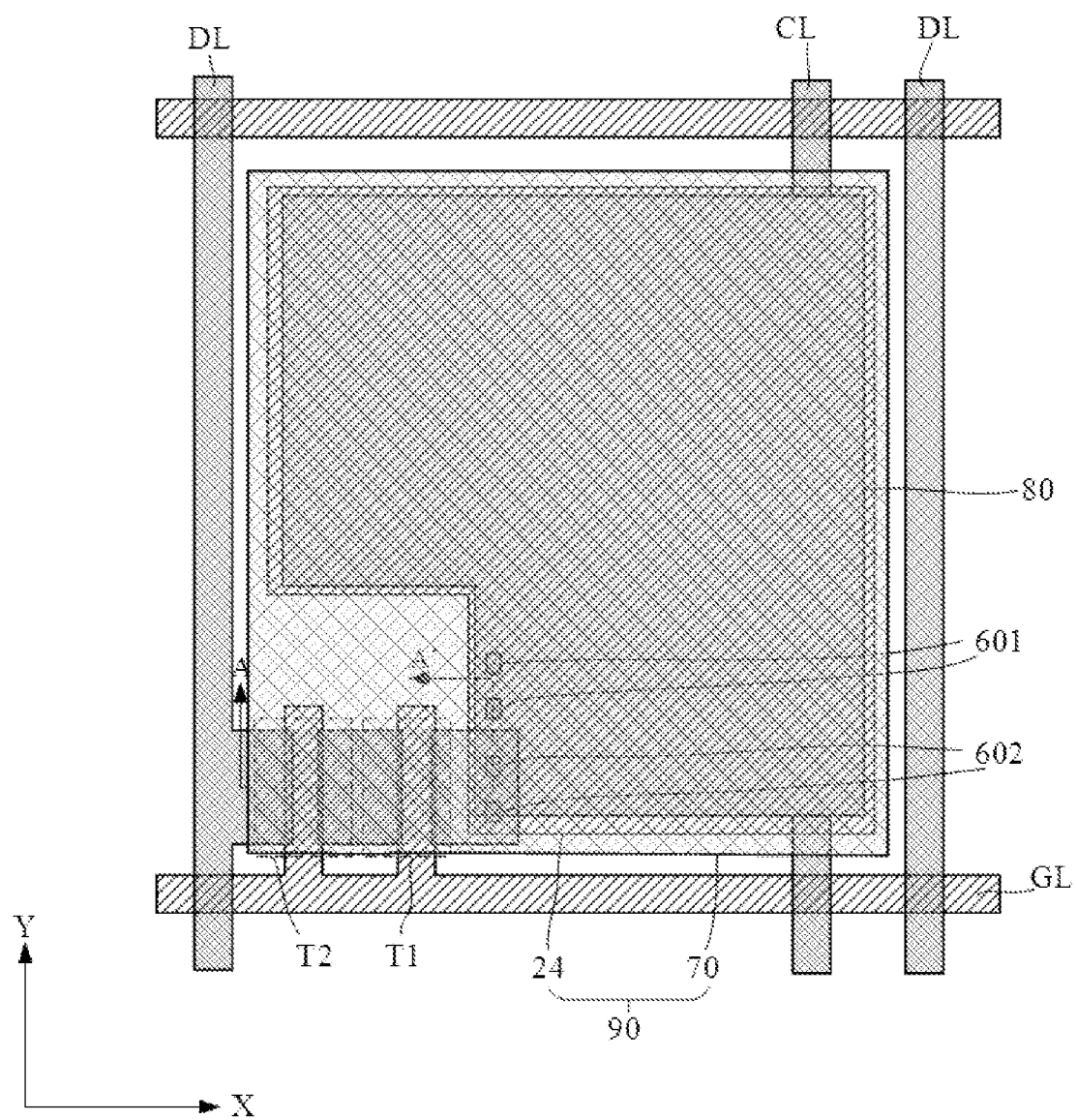
FIG. 9 is a schematic plan view of a pixel included in a display substrate according to some exemplary embodiments of the present disclosure.
Figure 10:
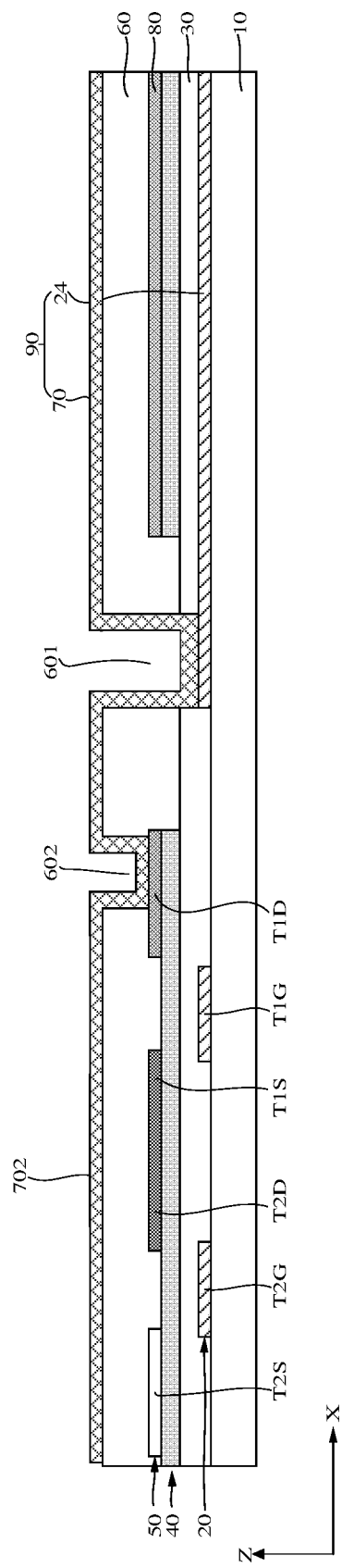
FIG. 10 is a cross-sectional view of the display substrate taken along line AA' in FIG. 9 according to some exemplary embodiments of the present disclosure.

FIG. 9 is a schematic plan view of a pixel included in a display substrate according to some exemplary embodiments of the present disclosure. FIG. 10 is a cross-sectional view of the display substrate taken along line AA' in FIG. 9 according to some exemplary embodiments of the present disclosure. The following will mainly describe differences between the embodiment shown in FIG. 9 and FIG. 10 with respect to the above embodiments, and other similarities may refer to the above descriptions.

Referring to FIGS. 9 and 10, an orthographic projection of a pixel conductive layer 70 on a base substrate 10 substantially covers an orthographic projection of both a first thin film transistor T1 and a second thin film transistor T2 on the base substrate 10. That is, the orthographic projection of the pixel conductive layer 70 on the base substrate 10 covers an orthographic projection of a first drain electrode T1D of the first thin film transistor T1 on the base substrate 10, the orthographic projection of the pixel conductive layer 70 on the base substrate 10 also covers an orthographic projection of a combination of a first source electrode T1S of the first thin film transistor T1 and a second drain electrode T2D of the second thin film transistor T2 on the base substrate 10, the orthographic projection of the pixel conductive layer 70 on the base substrate 10 also covers an orthographic projection of each of a first gate electrode T1G of the first thin film transistor T1 and a second gate electrode T2G of the second thin film transistor T2 on the base substrate 10, and the orthographic projection of the pixel conductive layer 70 on the base substrate 10 also covers an orthographic projection of a second source electrode T2S of the second thin film transistor T2 on the base substrate 10.

Referring to FIG. 9, the orthographic projection of the pixel conductive layer 70 on the base substrate 10 has a rectangular or approximately rectangular shape. For example, the approximate rectangle may include a rectangle with rounded corners, and the rectangle or the approximate rectangle has a no gap design.

In this way, a coverage area of the pixel conductive layer 70 may be further increased, that is, a coverage area of a pixel electrode 90 may be further increased, so as to further increase an opening ratio of each pixel, thereby the display performance may be improved.

For example, in the embodiment shown in FIGS. 9 to 10, a width of a channel region of each of the first thin film transistor T1 and the second thin film transistor T2 may be 40 micrometers and a length of thereof may be 4.5 micrometers. The first thin film transistor T1 and the second thin film transistor T2 connected in series may be regarded as a thin film transistor with a double gate structure. An aspect ratio of the channel of the thin film transistor with the double gate structure may be 40/(4.5+4.5). Under conditions of a same pixel size and a same thin film transistor size, the opening ratio of the pixel may be increased to 84.46%. It may be seen that the opening ratio may be further improved significantly.

It should be noted that, in this embodiment, an on-state current Ion of the thin film transistor is slightly increased compared to the on-state current Ion of the thin film transistor in the embodiment shown in FIGS. 4 to 6A; an off-state current Ioff of the thin film transistor in this embodiment increases significantly compared to the off-state current Ioff of the thin film transistor in the embodiment shown in FIGS. 4 to 6A.

Figure 11:
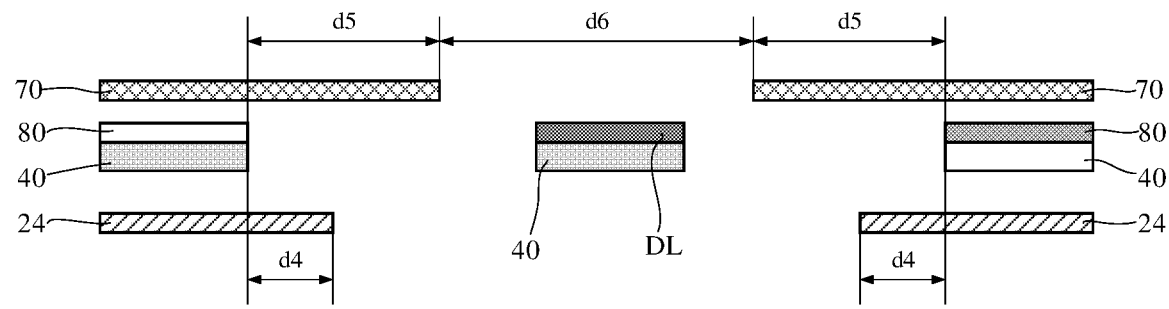
FIG. 11 is a cross-sectional view of the display substrate taken along line BB' in FIG. 4 according to some exemplary embodiments of the present disclosure.
Figure 12:
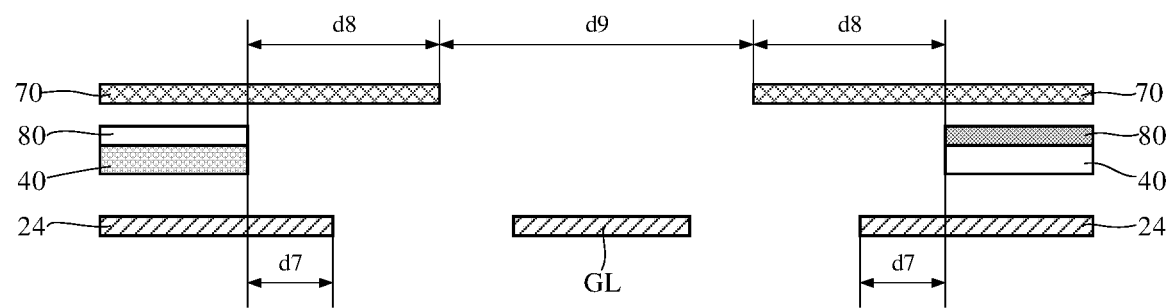
FIG. 12 is a cross-sectional view of the display substrate taken along line CC' in FIG. 4 according to some exemplary embodiments of the present disclosure.

FIG. 11 is a cross-sectional view taken along line BB' in FIG. 4 according to some exemplary embodiments of the present disclosure, and FIG. 12 is a cross-sectional view taken along line CC' in FIG. 4 according to some exemplary embodiments of the present disclosure. It should be noted that, in order to clearly illustrate a relative positional relationship between the first conductive layer, the active layer, the second conductive layer and the pixel conductive layer, some other layers are omitted in FIGS. 11 and 12.

With reference to FIGS. 4 to 6A and FIGS. 11 and 12, the pixel electrode 90 and the common electrode 80 are disposed in each pixel P, wherein the pixel electrode 90 includes the gate conductive layer 24 and the pixel conductive layer 70.

In a Z direction perpendicular to the base substrate 10, the common electrode 80 is disposed between the gate conductive layer 24 and the pixel conductive layer 70. In this way, a capacitance is formed between the pixel conductive layer 70 and the common electrode 80, and between the gate conductive layer 24 and the common electrode 80, so that a capacitance value of a storage capacitor Cst may be increased. In this way, a holding time of the electronic paper display device during display may be increased. It should be understood that, for the electronic paper display device, a display time is relatively long, so it is required to have a relatively long holding time during display. In the embodiments of the present disclosure, by disposing such the structure, the display device may have a relatively long holding time, which is beneficial to improve the display performance.

In each pixel P, the area of the pixel conductive layer 70 is set to be the largest. That is, the orthographic projection of the pixel conductive layer 70 on the base substrate 10 covers the orthographic projection of each of the gate conductive layer 24 and the common electrode 80 on the base substrate 10. Because the coverage area of the pixel conductive layer 70 determines the opening ratio of pixel, the opening ratio of pixel may be increased in this way.

In each pixel P, an area of the gate conductive layer 24 is smaller than the area of the pixel conductive layer 70 and is greater than an area of the common electrode 80. That is, the orthographic projection of the gate conductive layer 24 on the base substrate 10 falls within the orthographic projection of the pixel conductive layer 70 on the base substrate 10, and covers the orthographic projection of the common electrode 80 on the base substrate 10. The area of the gate conductive layer 24 is associated with the capacitance value of the storage capacitor Cst. Through such arrangement, a designed value of the capacitance value of the storage capacitor Cst may be better matched. In addition, by setting the area of the gate conductive layer 24 to be greater than the area of the common electrode 80, ESD (ie, electrostatic discharging) may be avoided, thereby product yield may be improved.

In the exemplary embodiments, in each pixel P, a side surface of the common electrode 80 is retracted inwardly in the X direction (that is, in a direction away from the data line DL) relative to a side surface of the pixel conductive layer 70 by a distance d5. For example, the d5 may be about 12.5 micrometers. A side surface of the common electrode 80 is retracted inwardly in the X direction (that is, in a direction away from the data line DL) relative to a side surface of the gate conductive layer 24 by a distance d4. For example, the d4 may be about 5.35 micrometers. Another side surface of the common electrode 80 is retracted inwardly in the Y direction (that is, in a direction away from the gate line GL) relative to another side surface of the pixel conductive layer 70 by a distance d8. For example, the d8 may be about 12.6 micrometers. Another side surface of the common electrode 80 is retracted inwardly in the Y direction (that is, in a direction away from the gate line GL) relative to another side surface of the gate conductive layer 24 by a distance d7, and the d7 may be about 5.35 micrometers.

In two adjacent pixels P, pixel conductive layers 70 of the pixel electrodes 90 are disposed at an interval with each other, and a distance between the pixel conductive layers 70 is set as small as possible, as long as a crosstalk between adjacent pixels may be avoided. For example, in the exemplary embodiments, pixel conductive layers 70 in two adjacent pixels P are disposed at a distance d6 in the row direction X and are disposed at a distance d9 in the column direction Y. For example, each of the d6 and d9 may be about 14 micrometers. Through such arrangement, under a premise of avoiding crosstalk between adjacent pixels, the coverage area of each pixel electrode may be made as large as possible, so that the opening ratio of pixel may be increased as much as possible. In addition, through such arrangement, the d6 may be made larger than a width of the data line DL in the row direction X, and the d9 may be made larger than a width of the gate line GL in the row direction X.

In two adjacent pixels P, common electrodes 80 are electrically connected to each other by the common electrode line CL extending in the Y direction.

Figure 13:
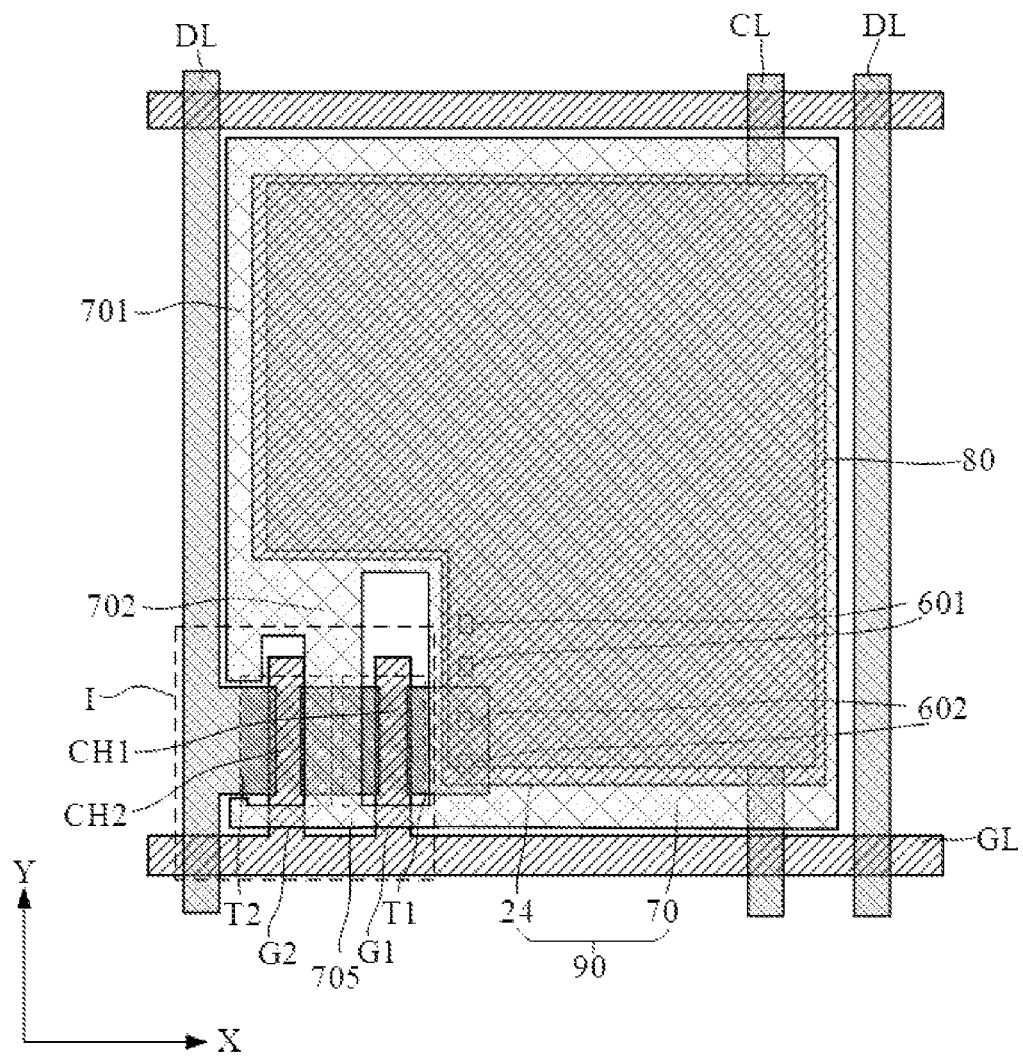
FIG. 13 is a schematic plan view of a pixel included in a display substrate according to some exemplary embodiments of the present disclosure.
Figure 14:
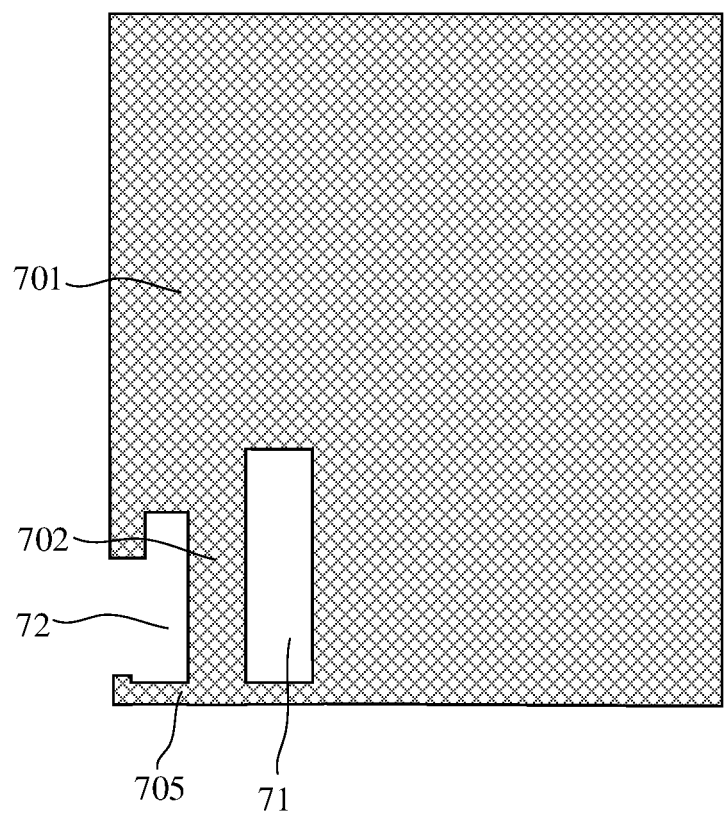
FIG. 14 is a schematic plan view of a pixel conductive layer included in the display substrate in FIG. 13.
Figure 15:
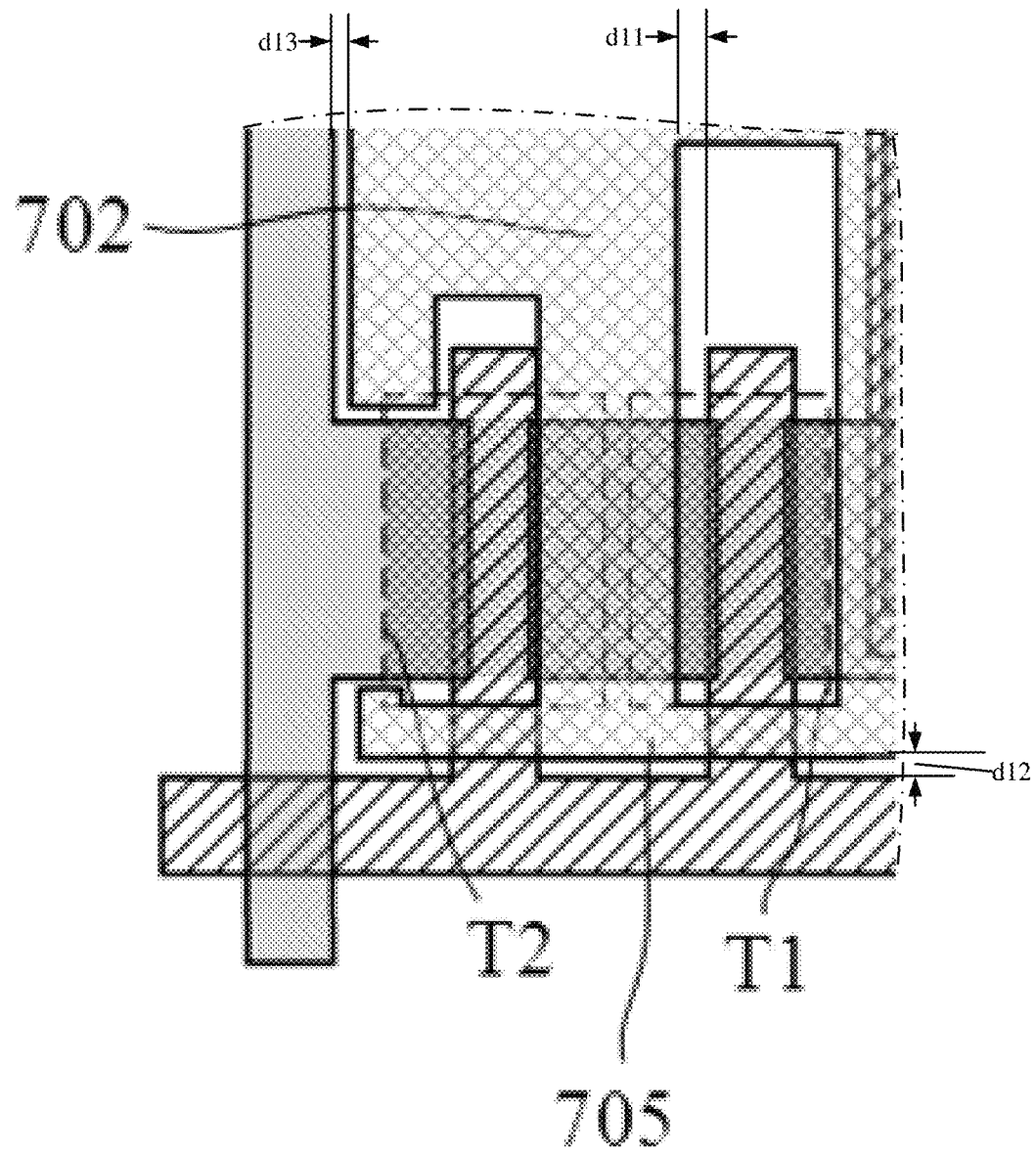
FIG. 15 is a partial enlarged view of part I in FIG. 13.

FIG. 13 is a schematic plan view of a pixel included in a display substrate according to some exemplary embodiments of the present disclosure. FIG. 14 is a schematic plan view of a pixel conductive layer included in the display substrate in FIG. 13. FIG. 15 is a partial enlarged view of part I in FIG. 13. The following will mainly describe differences between the embodiment shown in FIG. 13, FIG. 14, and FIG. 15 relative to the above-mentioned various embodiments, and other similarities may refer to the above descriptions.

Referring to FIGS. 13-15 in combination, a pixel conductive layer 70 may include a body portion 701, a first protrusion portion 702 extending from the body portion 701 and a second protrusion portion 705 extending from the body portion. The first protrusion 701 extends in a column direction Y, the second protrusion 705 extends in a row direction X, the first protrusion 702 and the second protrusion 705 are connected to each other, so that the pixel conductive layer 70 includes a first opening 71 and a second opening 72. A first thin film transistor T1 and a second thin film transistor T2 respectively includes channel regions CH1, CH2 in an active layer 40, the first opening 71 exposes the channel region CH1 of the first thin film transistor T1, and the second opening 72 exposes the channel region CH2 of the second thin film transistor T2.

For example, the display substrate may include a first gate protrusion G1 and a second gate protrusion G2 extending from a gate line GL, an overlapping area between the first gate protrusion G1 and the active layer 40 of the first thin film transistor forms a gate electrode T1G of the first thin film transistor, and an overlapping area between the second gate protrusion G2 and the active layer 40 of the second thin film transistor forms a gate electrode T2G of the second thin film transistor.

For example, an orthographic projection of a combination of a second electrode (such as a source electrode T1S) of the first thin film transistor and a first electrode (such as a drain electrode T2D) of the second thin film transistor on the base substrate at least partially overlaps with an orthographic projection of the first gate protrusion G1 on the base substrate, an orthographic projection of the first protrusion 702 on the base substrate and an orthographic projection of the channel region CH1 of the first thin film transistor T1 on the base substrate are disposed at an interval, and the orthographic projection of the first protrusion 702 on the base substrate and an orthographic projection of the channel region CH2 of the second thin film transistor T2 on the base substrate are disposed at an interval.

For example, the orthographic projection of the first gate protrusion G1 on the base substrate at least partially overlaps with an orthographic projection of the second protrusion 705 on the base substrate. For example, the orthographic projection of the first gate protrusion G1 on the base substrate intersects with the orthographic projection of the second protrusion 705 on the base substrate.

For example, an orthographic projection of the second gate protrusion G2 on the base substrate at least partially overlaps with the orthographic projection of the second protrusion 705 on the base substrate. For example, the orthographic projection of the second gate protrusion G2 on the base substrate intersects with the orthographic projection of the second protrusion 705 on the base substrate.

Figure 16:
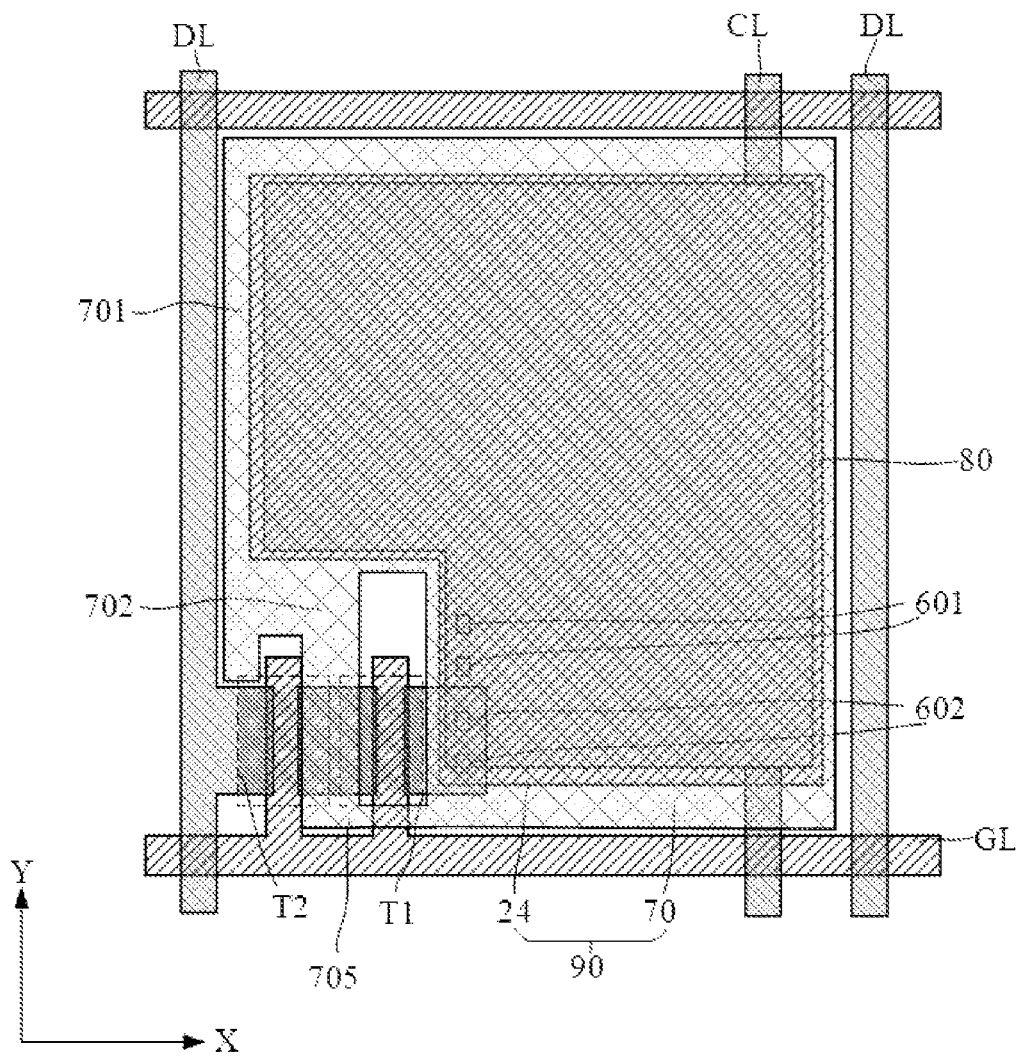
FIG. 16 is a schematic plan view of a pixel included in a display substrate according to some exemplary embodiments of the present disclosure.
Figure 17:
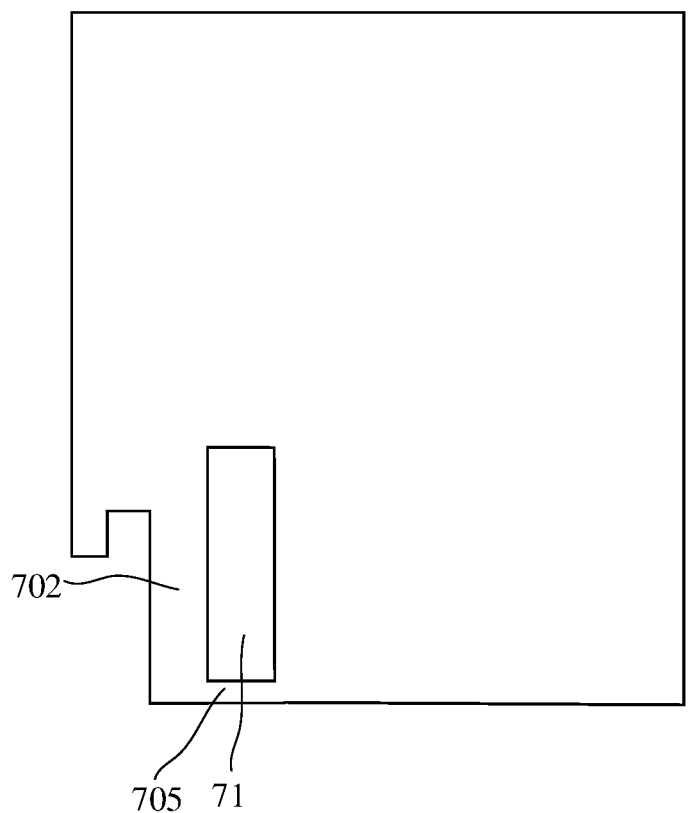
FIG. 17 is a schematic plan view of a pixel conductive layer included in the display substrate in FIG. 16.

FIG. 16 is a schematic plan view of a pixel included in a display substrate according to some exemplary embodiments of the present disclosure. FIG. 17 is a schematic plan view of the pixel conductive layer included in the display substrate in FIG. 16. Optionally, referring to FIGS. 16 and 17, an orthographic projection of a second gate protrusion G2 on the base substrate does not overlap with an orthographic projection of a second protrusion 705 on the base substrate. That is, the second protrusion 705 does not extend to a position overlapping the second gate protrusion G2.

Referring to FIGS. 13 to 17, the orthographic projection of the second protrusion 705 on the base substrate and an orthographic projection of a channel region CH1 of a first thin film transistor on the base substrate are disposed at an interval, and the orthographic projection of the second protrusion 705 on the base substrate and an orthographic projection of a channel region CH2 of a second thin film transistor on the base substrate are disposed at an interval.

For example, an orthographic projection of a pixel conductive layer 70 of a pixel electrode on the base substrate and an orthographic projection of a second electrode of the second thin film transistor (for example, T2S) on the base substrate are disposed at an interval.

For example, the orthographic projection of the pixel conductive layer 70 of the pixel electrode on the base substrate and an orthographic projection of each of gate line GL and data line DL on the base substrate are disposed at an interval.

In the above embodiment, by designing a digging pixel conductive layer 70, an opening ratio of the pixel may be effectively increased, while the digging pixel conductive layer 70 does not overlap with the channel region and gate electrode of the thin film transistor, which may avoid adverse effects on the performance of the thin film transistor.

For example, a distance (for example, as shown in d11 in FIG. 15) between the orthographic projection of the first protrusion 702 on the base substrate and an orthographic projection of each of the channel regions CH1 and CH2 of the first thin film transistor and the second thin film transistor on the base substrate in the row direction X is 1 to 3 micrometers.

For example, a distance (for example, as shown in d12 in FIG. 15) between the orthographic projection of the second protrusion 705 on the base substrate and the orthographic projection of the gate line GL on the base substrate in the column direction Y is 0.01 to 3 micrometers.

For example, a distance (for example, as shown in d13 in FIG. 15) between an orthographic projection of the body portion 701 on the base substrate and the orthographic projection of the data line DL on the base substrate in the row direction X is 0.01 to 3 micrometers. In the embodiments of the present disclosure, the orthographic projection of the pixel conductive layer 70 of the pixel electrode on the base substrate and the orthographic projection of data line DL on the base substrate are disposed at an interval, that is, the pixel conductive layer 70 of the pixel electrode does not overlap with the data line DL, so as to prevent generation of a coupling capacitor between the pixel conductive layer 70 and the data line DL. In this way, it is possible to prevent an on-state current Ion of the thin film transistor from being reduced, thereby facilitating charging of the pixel.

In the above embodiments, the orthographic projection of the pixel conductive layer 70 of the pixel electrode on the base substrate and the orthographic projection of each of the gate line GL and the data line DL on the base substrate are disposed at an interval, and the interval is set to be relatively small. In this way, on one hand, the coverage area of the pixel conductive layer 70 may be effectively increased, thereby helping to increase the opening ratio of pixel; on the other hand, the generation of the coupling capacitance may be avoided, and the adverse effect on the performance of the device may be reduced.

Some exemplary embodiments of the present disclosure also provide a display device. Referring to FIG. 6B, the display device may include the above-mentioned display substrate. The display device may also include the electronic ink layer 100, the electronic ink layer 100 may be disposed on the side of the pixel conductive layer 70 away from the base substrate 10. For example, the electronic ink layer 100 may be disposed on the counter substrate 110. For example, the electronic ink layer 100 and the counter substrate 110 may adopt a paper film structure known in the art, which will not be repeated here.

It should be understood that the display device according to some exemplary embodiments of the present disclosure has all the features and the advantages of the above-mentioned display substrate, and these features and advantages may be referred to the above descriptions of the display substrate, which will not be repeated here.

Figure 18:
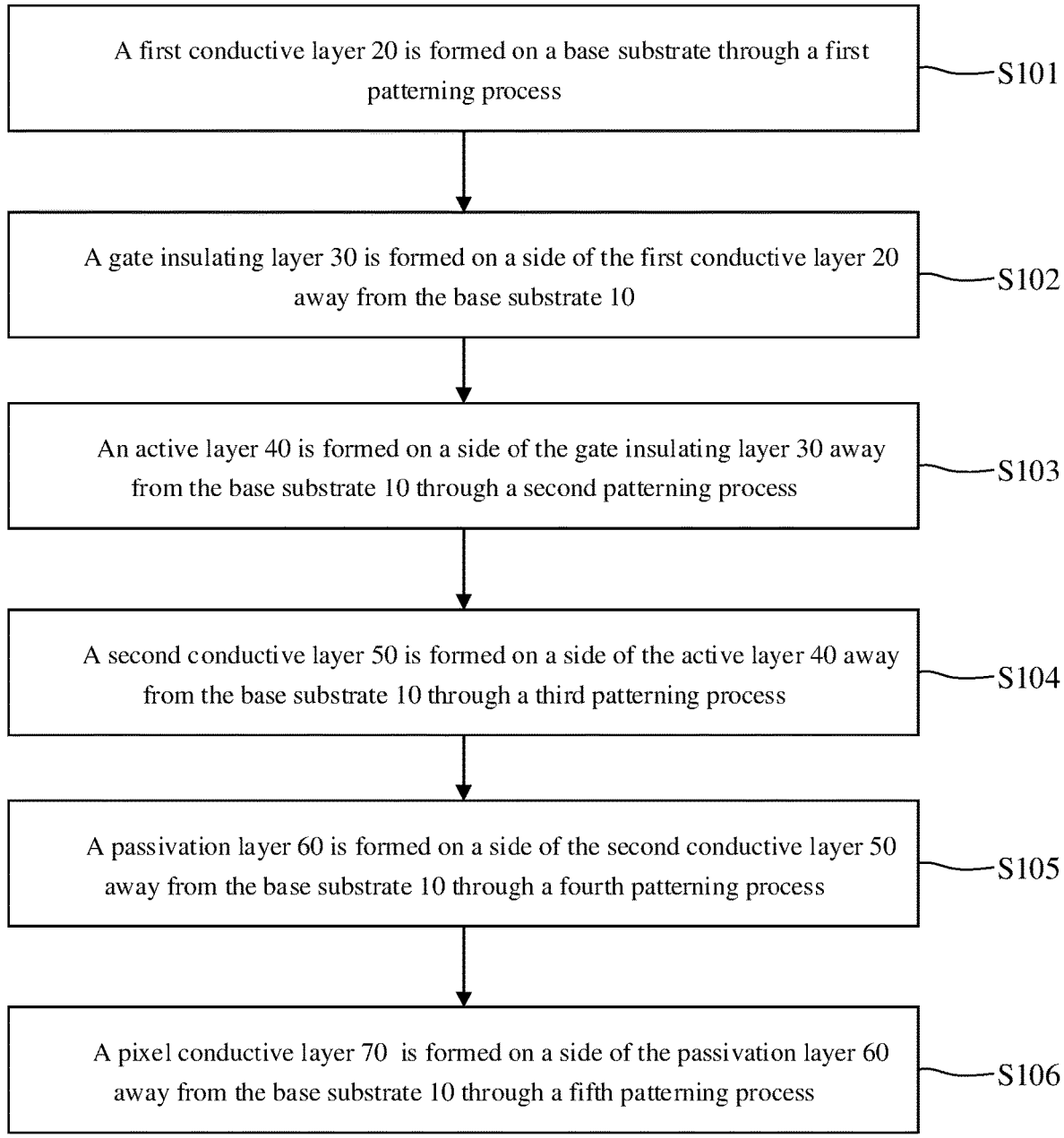
FIG. 18 is a flowchart of a method for manufacturing a display substrate according to some exemplary embodiments of the present disclosure.

FIG. 18 is a flowchart of a method for manufacturing a display substrate according to some exemplary embodiments of the present disclosure. Referring to FIG. 18, the method for manufacturing the display substrate may include five patterning processes. For example, the method may include following steps S101 to S106.

In step S101, a first conductive layer 20 is formed on a base substrate 10. For example, a gate metal material layer may be formed on the base substrate 10, and the first conductive layer 20 including a first gate electrode T1G of a first thin film transistor T1, a second gate electrode T2G of a second thin film transistor T2, a gate line GL and a gate conductive layer 24 is formed through a first patterning process.

In step S102, a gate insulating layer 30 is formed on a side of the first conductive layer 20 away from the base substrate 10. The gate insulating layer 30 may cover the base substrate. Specifically, an orthographic projection of the gate insulating layer 30 on the base substrate 10 covers an orthographic projection of each of the first gate electrode T1G of the first thin film transistor T1, the second gate electrode T2G of the second thin film transistor T2, the gate line GL and the gate conductive layer 24 on the base substrate 10.

In step S103, an active layer 40 is formed on a side of the gate insulating layer 30 away from the base substrate 10. For example, a semiconductor material layer may be formed on the side of the gate insulating layer 30 away from the base substrate 10, and then the active layer 40 may be formed through a second patterning process.

In step S104, a second conductive layer 50 is formed on a side of the active layer 40 away from the base substrate 10. For example, a source and drain metal material layer may be formed on the side of the active layer 40 away from the base substrate 10, and the second conductive layer 50 including a first source electrode T1S and a first drain electrode T1D of the first thin film transistor T1, a second source electrode T2S and a second drain electrode T2D of the second thin film transistor T2, a data line DL, a common electrode line CL and a common electrode 80 is formed through a third patterning process.

In step S105, a passivation layer 60 is formed on a side of the second conductive layer 50 away from the base substrate 10. For example, an insulating material layer may be formed on the side of the second conductive layer 50 away from the base substrate 10, and the passivation layer 60 including via holes 601 and 602 is formed through a fourth patterning process.

In step S106, a pixel conductive layer 70 is formed on a side of the passivation layer 60 away from the base substrate 10. For example, a transparent conductive material (such as ITO) layer may be formed on the side of the passivation layer 60 away from the base substrate 10, and the pixel conductive layer 70 is formed through a fifth patterning process.

The pattern of the pixel conductive layer 70 may refer to FIG. 5, FIG. 7, FIG. 9, FIG. 15 and FIG. 17.

Figure 19:
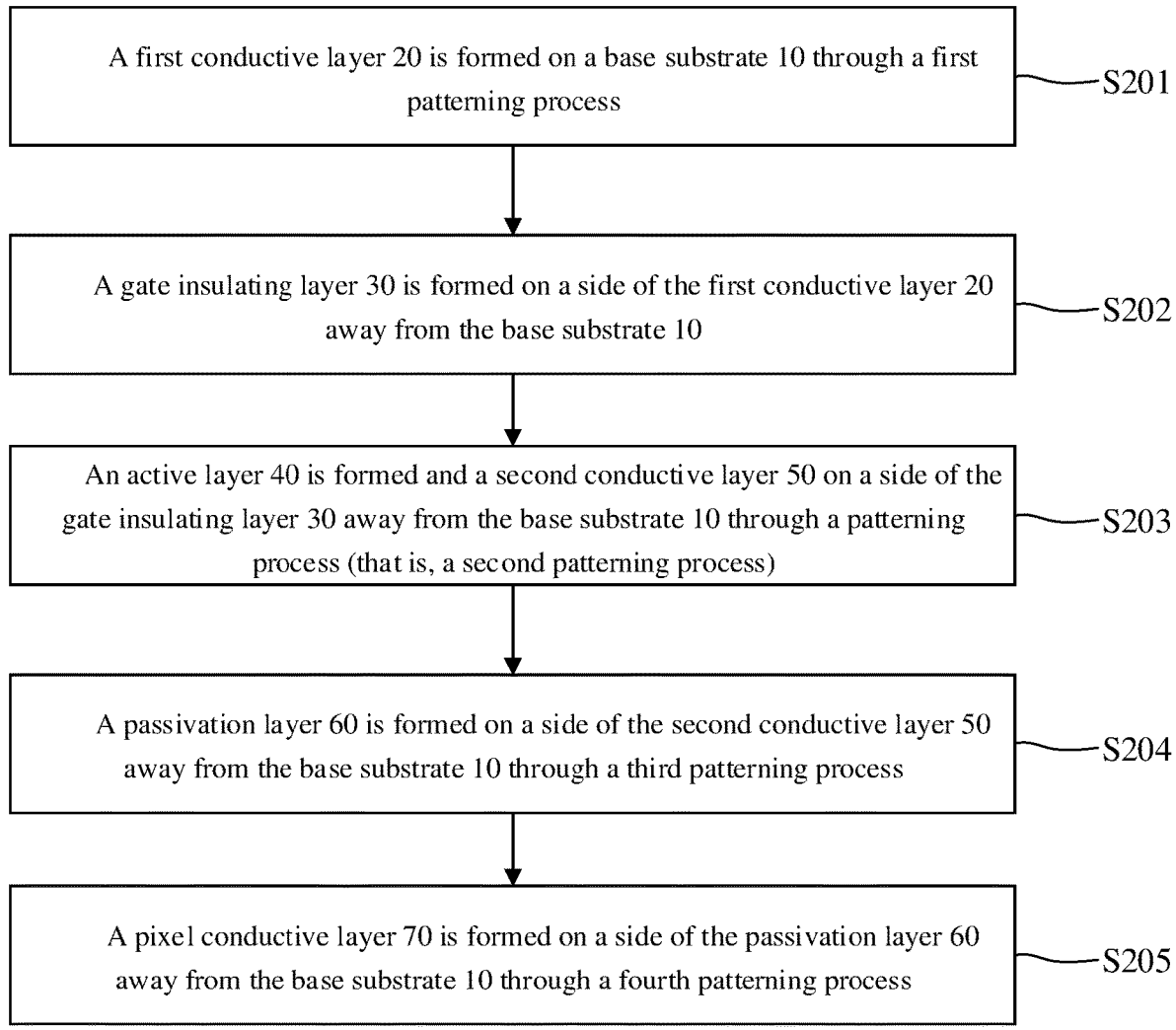
FIG. 19 is a flowchart of a method for manufacturing a display substrate according to some exemplary embodiments of the present disclosure.

FIG. 19 is a flowchart of a method for manufacturing a display substrate according to some exemplary embodiments of the present disclosure. Referring to FIG. 19, the method for manufacturing the display substrate may include 4 patterning processes. For example, the method may include following steps S201 to S205.

In step S201, a first conductive layer 20 is formed on a base substrate 10. For example, a gate metal material layer may be formed on the base substrate 10, and the first conductive layer 20 including a first gate electrode T1G of a first thin film transistor T1, a second gate electrode T2G of a second thin film transistor T2, a gate line GL and a gate conductive layer 24 is formed through a first patterning process.

In step S202, a gate insulating layer 30 is formed on a side of the first conductive layer 20 away from the base substrate 10. The gate insulating layer 30 may cover the base substrate. Specifically, an orthographic projection of the gate insulating layer 30 on the base substrate 10 covers an orthographic projection of each of the first gate electrode T1G of the first thin film transistor T1, the second gate electrode T2G of the second thin film transistor T2, the gate line GL and the gate conductive layer 24 on the base substrate 10.

In step S203, an active layer 40 and a second conductive layer 50 are formed on a side of the gate insulating layer 30 away from the base substrate 10 through a patterning process (that is, a second patterning process).

Specifically, step S203 may be performed according to following steps.

Figure 20A:
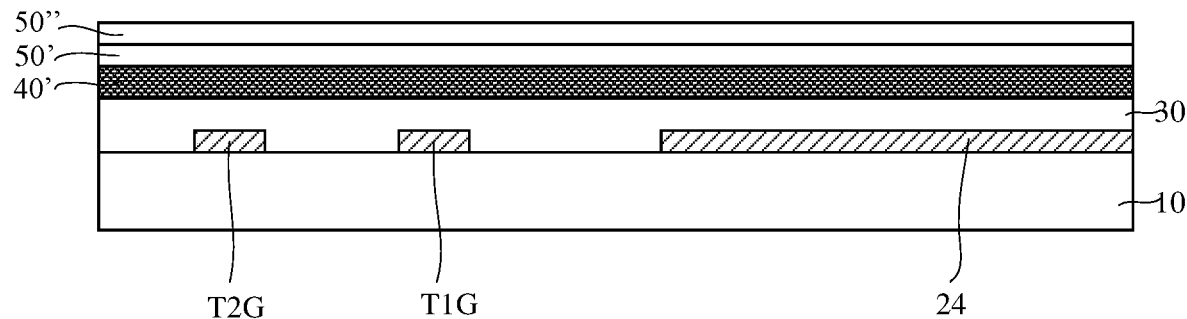
FIGS. 20A to 20F are cross-sectional views of a structure formed after some specific steps in the manufacturing method in FIG. 19 are performed, respectively.

As shown in FIG. 20A, a semiconductor material layer 40' and a source and drain metal material layer 50' may be sequentially formed on the side of the gate insulating layer 30 away from the base substrate 10, and a photoresist 50" is coated on the source and drain metal material layer 50'.

Figure 20B:
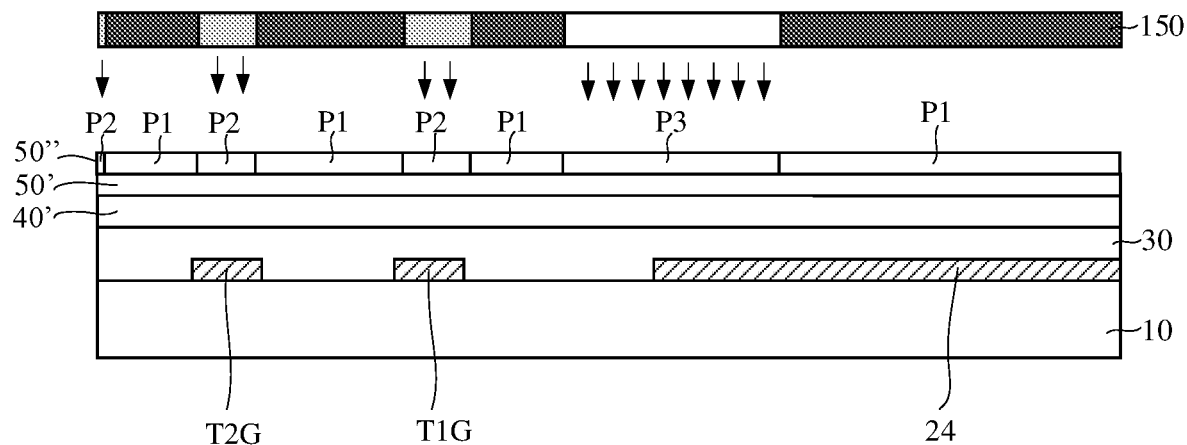

As shown in FIG. 20B, the photoresist 50" is exposed through a halftone mask 150 to form an unexposed area P1, a semi-exposed area P2 and a fully exposed area P3. The unexposed area P1 corresponds to the second conductive layer 50 to be formed including a first source electrode T1S and a first drain electrode T1D of the first thin film transistor T1, a second source electrode T2S and a second drain electrode T2D of the second thin film transistor T2, a data line DL, a common electrode line CL and a common electrode 80, The semi-exposed area P2 corresponds to a part of the active layer 40 to be formed which does not overlap with the second conductive layer 50, and the fully exposed area P3 corresponds to the rest of the base substrate 10. In other words, an orthographic projection of the unexposed area P1 on the base substrate 10 overlaps with an orthographic projection of the second conductive layer 50 to be formed on the base substrate 10; an orthographic projection of the semi-exposed area P2 on the base substrate 10 falls within an orthographic projection of the active layer 40 to be formed on the base substrate 10, and the orthographic projection of the semi-exposed area P2 on the base substrate 10 does not overlap with the orthographic projection of the second conductive layer 50 to be formed on the base substrate 10; an orthographic projection of the fully exposed area P3 on the base substrate 10 does not overlap with orthographic projections of the active layer 40 to be formed and the second conductive layer 50 to be formed on the base substrate 10.

Figure 20C:
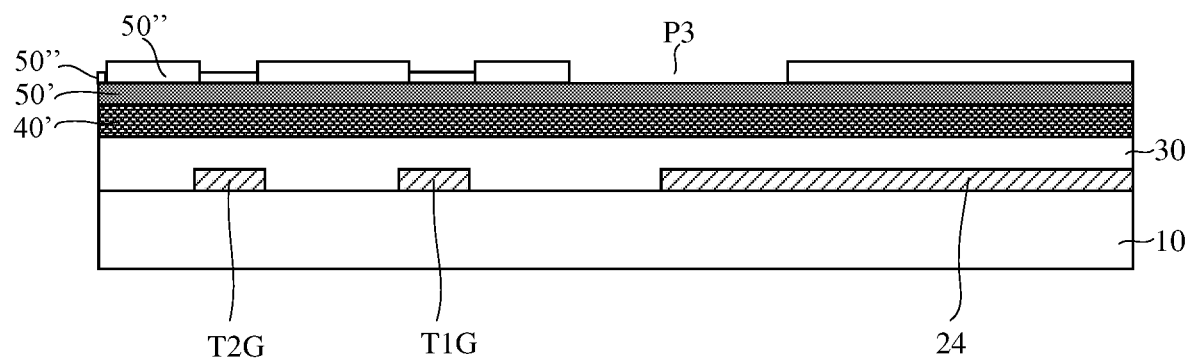

As shown in FIG. 20C, the photoresist 50" is developed, the photoresist in the unexposed area P1 is completely retained, the photoresist in the semi-exposed area P2 is partially removed, and a photoresist in the fully exposed area P3 is completely removed.

Figure 20D:
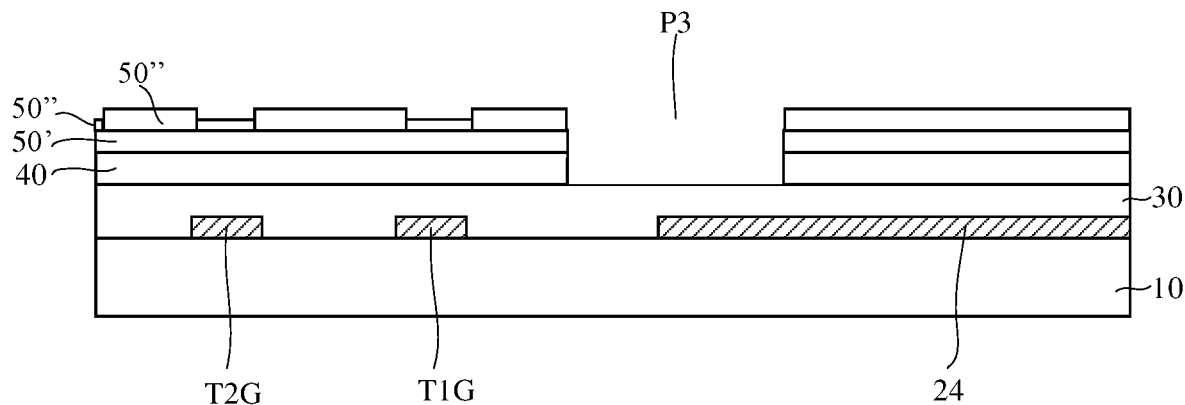

As shown in FIG. 20D, a part of the semiconductor material layer 40' and the source and drain metal material layer 50' that are located in the fully exposed area P3 are removed thorough an etching process.

Figure 20E:
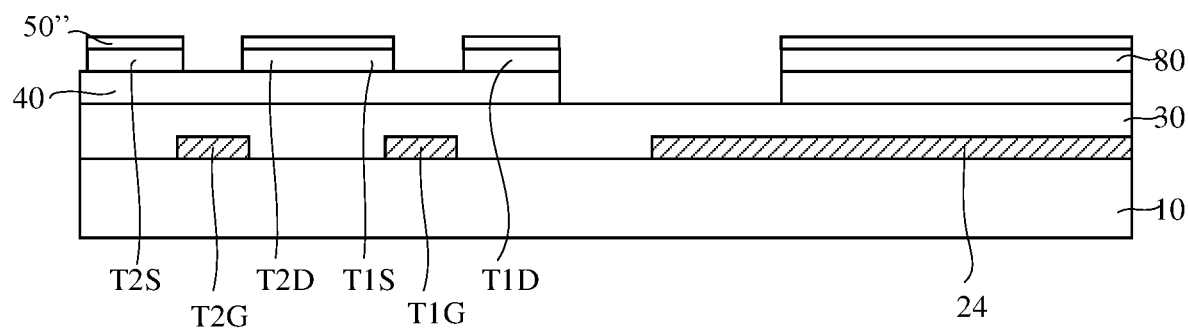

As shown in FIG. 20E, the photoresist 50" is ashed to remove all the photoresist in the semi-exposed area P2 and part of the photoresist in the unexposed area P1, and the part of the source and drain metal material layer 50' located in the semi-exposed area P2 is removed through an etching process.

Figure 20F:
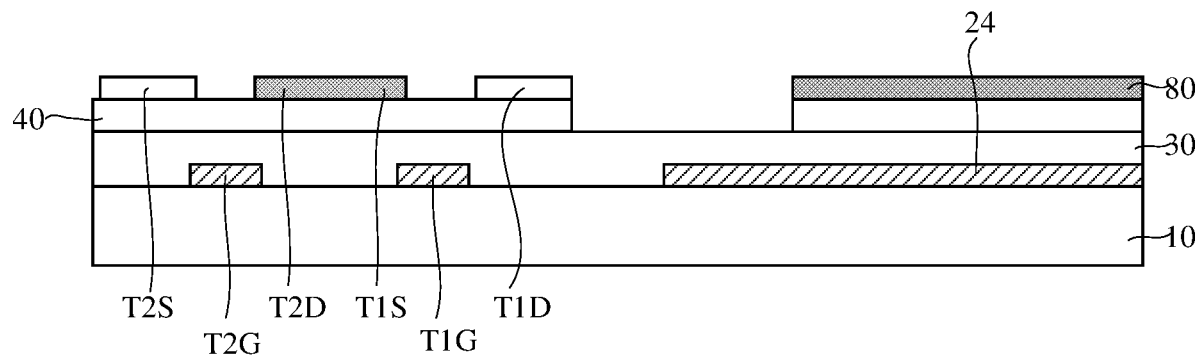

As shown in FIG. 20F, the photoresist in the unexposed area P1 is completely removed.

In this way, by using the halftone mask, the active layer 40 and the second conductive layer 50 may be formed by a patterning process, so that a patterning process may be saved.

In step S204, a passivation layer 60 is formed on a side of the second conductive layer 50 away from the base substrate 10. For example, an insulating material layer may be formed on the side of the second conductive layer 50 away from the base substrate 10, and the passivation layer 60 including via holes 601 and 602 may be formed through a third patterning process.

In step S205, a pixel conductive layer 70 is formed on a side of the passivation layer 60 away from the base substrate 10. For example, a transparent conductive material (such as ITO) layer may be formed on the side of the passivation layer 60 away from the base substrate 10, and the pixel conductive layer 70 may be formed through a fourth patterning process.

The pattern of the pixel conductive layer 70 may refer to FIG. 5, FIG. 7, FIG. 9, FIG. 15 and FIG. 17.

It should be noted that some steps of the above manufacturing method may be performed individually or in combination, and may be performed in parallel or sequentially, and are not limited to the specific operation sequence shown in the drawings.

It should be understood that the method for manufacturing the display substrate according to some exemplary embodiments of the present disclosure has all the characteristics and the advantages of the above-mentioned display substrate, and these characteristics and advantages may be referred to the above descriptions of the display substrate, which will not be repeated here.

As used herein, the terms "substantially", "about", "approximately" and other similar terms are used as approximate terms rather than as terms of degree, and the terms are intended to explain an inherent deviation of measured or calculated values recognized by those skilled in the art. Taking into account factors such as process fluctuations, measurement problems and errors associated with the measurement of specific quantities (i.e, limitations of the measurement system), the terms "about" or "approximately" used herein includes the stated value, and means that a specific value determined by those skilled in the art is within an acceptable range of deviation. For example, "about" may refer to be within one or more standard deviations, or may be within ±10% or ±5% of the stated value.

Although some embodiments according to the general inventive concept of the present disclosure have been illustrated and described, those skilled in the art will understand that, changes may be made to the embodiments without departing from the principle and spirit of the general inventive concept of the present disclosure, and the scope of the present disclosure is defined by the claims and their equivalents.

What is claimed is:

1. A display substrate, comprising:
a base substrate;
a plurality of gate lines and a plurality of data lines on the base substrate, wherein each gate line extends in a row direction, each data line extends in a column direction, and the plurality of gate lines and the plurality of data lines intersect to surround a plurality of pixels;
a first thin film transistor and a second thin film transistor in each pixel on the base substrate, wherein each of the first thin film transistor and the second thin film transistor comprises a first electrode and a second electrode; and
a pixel electrode in each pixel on the base substrate, wherein the pixel electrode comprises a pixel conductive layer, the first electrode is located in a layer different from a layer where the pixel conductive layer is located, and the second electrode is located in a layer different from the layer where the pixel conductive layer is located,
wherein the first electrode of the first thin film transistor is electrically connected to the pixel conductive layer of the pixel electrode, the second electrode of the first thin film transistor is electrically connected to the first electrode of the second thin film transistor, and the second electrode of the second thin film transistor is electrically connected to the data line; and
wherein an orthographic projection of a combination of the second electrode of the first thin film transistor and the first electrode of the second thin film transistor on the base substrate at least partially overlaps with an orthographic projection of the pixel conductive layer of the pixel electrode on the base substrate.

2. The display substrate of claim 1, wherein each of the first thin film transistor and the second thin film transistor further comprises a gate electrode, and the gate electrode of the first thin film transistor and the gate electrode of the second thin film transistor are disposed at an interval in the row direction; and
wherein the orthographic projection of the pixel conductive layer on the base substrate and an orthographic projection of each of the gate electrode of the first thin film transistor and the gate electrode of the second thin film transistor on the base substrate are disposed at an interval.

3. The display substrate of claim 1, wherein the pixel conductive layer comprises a first protrusion, the orthographic projection of the combination of the second electrode of the first thin film transistor and the first electrode of the second thin film transistor on the base substrate at least partially overlaps with an orthographic projection of the first protrusion on the base substrate, the orthographic projection of the first protrusion on the base substrate and the orthographic projection of the gate electrode of the first thin film transistor on the base substrate are disposed at an interval, and the orthographic projection of the first protrusion on the base substrate and the orthographic projection of the gate electrode of the second thin film transistor on the base substrate are disposed at an interval.

4. The display substrate of claim 1, wherein the pixel conductive layer comprises a body portion, a first protrusion extending from the body portion and a second protrusion extending from the body portion, the first protrusion extends in the column direction, the second protrusion extends in the row direction, and the first protrusion and the second protrusion are connected to each other, so that the pixel conductive layer comprises a first opening and a second opening; and
wherein each of the first thin film transistor and the second thin film transistor comprises a channel region, the first opening exposes the channel region of the first thin film transistor, and the second opening exposes the channel region of the second thin film transistor.

5. The display substrate of claim 4, wherein the display substrate comprises a first gate protrusion and a second gate protrusion extending from the gate line, a gate electrode of the first thin film transistor is formed in an overlapping area between the first gate protrusion and the channel region of the first thin film transistor, and a gate electrode of the second thin film transistor is formed in an overlapping area between the second gate protrusion and the channel region of the second thin film transistor; and
wherein the orthographic projection of the combination of the second electrode of the first thin film transistor and the first electrode of the second thin film transistor on the base substrate at least partially overlaps with an orthographic projection of the first protrusion on the base substrate, the orthographic projection of the first protrusion on the base substrate and an orthographic projection of the channel region of the first thin film transistor on the base substrate are disposed at an interval, and the orthographic projection of the first protrusion on the base substrate and an orthographic projection of the channel region of the second thin film transistor on the base substrate are disposed at an interval.

6. The display substrate of claim 5, wherein an orthographic projection of the first gate protrusion on the base substrate at least partially overlaps with an orthographic projection of the second protrusion on the base substrate.

7. The display substrate of claim 6, wherein:
an orthographic projection of the second gate protrusion on the base substrate at least partially overlaps with the orthographic projection of the second protrusion on the base substrate; or
the orthographic projection of the second protrusion on the base substrate and the orthographic projection of the channel region of the first thin film transistor on the base substrate are disposed at an interval, and the orthographic projection of the second protrusion on the base substrate and the orthographic projection of the channel region of the second thin film transistor on the base substrate are disposed at an interval; or
an orthographic projection of the gate conductive layer on the base substrate covers an orthographic projection of the common electrode on the base substrate, and an area of the orthographic projection of the gate conductive layer on the base substrate is greater than an area of the orthographic projection of the common electrode on the base substrate.

8. The display substrate of claim 4, wherein:
the orthographic projection of the pixel conductive layer of the pixel electrode on the base substrate and an orthographic projection of the second electrode of the second thin film transistor on the base substrate are disposed at an interval; or the display substrate further comprises a common electrode, the common electrode is located in the same layer as the first electrode and the second electrode; the common electrode is located between the pixel conductive layer and the gate conductive layer, and an orthographic projection of each of the pixel conductive layer and the gate conductive layer on the base substrate at least partially overlaps with an orthographic projection of the common electrode on the base substrate.

9. The display substrate of claim 2, wherein the pixel electrode further comprises a gate conductive layer, and the gate conductive layer is electrically connected to the pixel conductive layer; and
wherein the gate conductive layer and the gate electrode are located in a same layer and are formed of a same material, and the first electrode and the second electrode are located on a side of the gate electrode away from the base substrate.

10. The display substrate of claim 5, wherein the orthographic projection of the pixel conductive layer on the base substrate covers an orthographic projection of the gate conductive layer on the base substrate, and an area of the orthographic projection of the pixel conductive layer on the base substrate is greater than an area of the orthographic projection of the gate conductive layer on the base substrate.

11. The display substrate of claim 3, wherein the orthographic projection of the pixel conductive layer of the pixel electrode on the base substrate at least partially overlaps with an orthographic projection of the second electrode of the second thin film transistor on the base substrate.

12. The display substrate of claim 6, wherein the pixel conductive layer further comprises the second protrusion, the orthographic projection of the second protrusion on the base substrate at least partially overlaps with an orthographic projection of the second electrode of the second thin film transistor on the base substrate, and the orthographic projection of the second protrusion on the base substrate and an orthographic projection of the gate electrode of the second thin film transistor on the base substrate are disposed at an interval.

13. The display substrate of claim 1, wherein the orthographic projection of the pixel conductive layer on the base substrate covers the orthographic projections of each of the gate electrode, the first electrode and the second electrode of each of the first thin film transistor and the second thin film transistor on the base substrate.

14. The display substrate of claim 3, wherein a width of the orthographic projection of the first protrusion on the base substrate in the row direction is 3.4 to 6.5 micrometers; and wherein:
a distance between the orthographic projection of the first protrusion on the base substrate and the orthographic projection of the gate electrode of the first thin film transistor on the base substrate in the row direction is 1.75 to 3.3 micrometers; and/or,
a distance between the orthographic projection of the first protrusion on the base substrate and the orthographic projection of the gate electrode of the second thin film transistor on the base substrate in the row direction is 1.75 to 3.3 micrometers.

15. The display substrate of claim 9, wherein:
a width of the orthographic projection of the second protrusion on the base substrate in the row direction is 3.4 to 4.4 micrometers; or
a distance between the orthographic projection of the second protrusion on the base substrate and an orthographic projection of the gate electrode of the second thin film transistor on the base substrate in the row direction is 1.75 to 2.75 micrometers; or the orthographic projection of the pixel conductive layer of the pixel electrode on the base substrate and an orthographic projection of each of the gate line and the data line on the base substrate are disposed at an interval; or
a distance between the orthographic projection of the first protrusion on the base substrate and the orthographic projection of the channel region of each of the first thin film transistor and the second thin film transistor on the base substrate in the row direction is 1 to 3 micrometers; or a distance between the orthographic projection of the second protrusion on the base substrate and an orthographic projection of the gate line on the base substrate in the column direction is 0.01 to 3 micrometers; or a distance between an orthographic projection of the body portion on the base substrate and an orthographic projection of the data line on the base substrate in the row direction is 0.01 to 3 micrometers.

16. The display substrate of claim 1, wherein:
the first electrode and the second electrode of the first thin film transistor and the first electrode and the second electrode of the second thin film transistor are located in the same layer, and the second electrode of the first thin film transistor and the first electrode of the second thin film transistor are a continuously extending structure; or
the pixel conductive layer comprises a transparent conductive material.

17. The display substrate of claim 4, wherein the first electrode and the second electrode of the first thin film transistor and the first electrode and the second electrode of the second thin film transistor are located in the same layer, and the display substrate further comprises:
a gate insulating layer on the base substrate and covering the gate electrode and the gate conductive layer;
an active layer on the base substrate, wherein the active layer is located between the gate insulating layer and a layer where the first electrode and the second electrode are located; and
a passivation layer on the base substrate, wherein the passivation layer is located between the layer where the first electrode and the second electrode are located and the pixel conductive layer,
wherein the pixel conductive layer is located on a side of the layer where the first electrode and the second electrode are located away from the base substrate, the pixel conductive layer is electrically connected to the first electrode of the first thin film transistor through a via hole formed in the passivation layer, and the pixel conductive layer is electrically connected to the gate conductive layer through a via hole formed in the passivation layer and the gate insulating layer.

18. The display substrate of claim 5, further comprising a common electrode line on the base substrate,
wherein the common electrode line extends parallel to the data line, common electrodes of the plurality of pixels are electrically connected through the common electrode line.

19. A display device, wherein the display device comprises:
the display substrate of claim 1; and
an electronic ink layer on a side of a pixel conductive layer away from a base substrate.

20. A method for manufacturing a display substrate, comprising:

forming a first conductive layer on a base substrate through a first patterning process, wherein the first conductive layer comprises a gate conductive layer and a gate electrode of each of a first thin film transistor and a second thin film transistor;

forming an active layer and a second conductive layer on a side of the first conductive layer away from the base substrate through a second patterning process, wherein the second conductive layer comprises a common electrode, a data line, and a first electrode and a second electrode of each of the first thin film transistor and the second thin film transistor;

forming a passivation layer on a side of the second conductive layer away from the base substrate through a third patterning process; and forming a pixel conductive layer on a side of the passivation layer away from the base substrate through a fourth patterning process, wherein the pixel conductive layer is electrically connected to the first electrode of the first thin film transistor and the gate conductive layer, the second electrode of the first thin film transistor is electrically connected to the first electrode of the second thin film transistor, and the second electrode of the second thin film transistor is electrically connected to a data line; and wherein an orthographic projection of a combination of the second electrode of the first thin film transistor and the first electrode of the second thin film transistor on the base substrate at least partially overlaps with an orthographic projection of the pixel conductive layer on the base substrate.

* * * * *